United States Patent
Chen et al.

(10) Patent No.: US 12,245,106 B2
(45) Date of Patent: Mar. 4, 2025

(54) NR SIDELINK GROUP COMMUNICATION

(71) Applicant: InterDigital Patent Holdings, Inc., Wilmington, DE (US)

(72) Inventors: Zhuo Chen, Claymont, DE (US); Pascal M. Adjakple, Great Neck, NY (US); Qing Li, Princeton Junction, NJ (US); Guodong Zhang, Woodbury, NY (US); Yifan Li, Conshohocken, PA (US); Joseph M. Murray, Schwenksville, PA (US); Rocco Di Girolamo, Laval (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 397 days.

(21) Appl. No.: 17/628,761

(22) PCT Filed: Aug. 13, 2020

(86) PCT No.: PCT/US2020/046052
§ 371 (c)(1),
(2) Date: Jan. 20, 2022

(87) PCT Pub. No.: WO2021/030520
PCT Pub. Date: Feb. 18, 2021

(65) Prior Publication Data
US 2022/0386081 A1    Dec. 1, 2022

Related U.S. Application Data

(60) Provisional application No. 62/886,622, filed on Aug. 14, 2019.

(51) Int. Cl.
*H04H 20/71* (2008.01)
*H04W 4/08* (2009.01)
*H04W 72/30* (2023.01)

(52) U.S. Cl.
CPC ............ *H04W 4/08* (2013.01); *H04W 72/30* (2023.01)

(58) Field of Classification Search
CPC .......... H04W 4/08; H04W 72/30; H04W 4/40
(Continued)

(56) References Cited

U.S. PATENT DOCUMENTS 11,838,936 B2 *  12/2023  Kung ................... H04W 72/54
2011/0069658 A1    3/2011  Tiwari
(Continued)

FOREIGN PATENT DOCUMENTS

CN    106797609 A    5/2017
CN    109156037 A    1/2019
(Continued)

OTHER PUBLICATIONS

3GPP, "3rd Generation Partnership Project; Technical Specification Group Services and System Aspects; Study on architecture enhancements to support Proximity-based Services (Prose) (Release 12)", Technical Report, 3GPP TR 23.703 V12.0.0, Feb. 2014, 324 pages.
(Continued)

*Primary Examiner* — Chuong T Ho
(74) *Attorney, Agent, or Firm* — Flaster Greenberg P.C.

(57) ABSTRACT

A Sidelink AS group management function is disclosed for a UE to discover group members and organize them into AS layer sub-groups based on the AS layer group context information. A centralized Sidelink AS group management is disclosed that the Sidelink AS Group Manager discovers group members and organizes them into AS layer sub-groups for a UE. A Subgroup formation and configuration procedure is disclosed that SL AS Group Manager organizes the ULG into AS layer sub-groups, configures UE-to-UE relays for each UE in the ULG and sends the AS group management information to the UE. A distributed Sidelink
(Continued)

AS group management method is disclosed that each UE discovers its group members and organizes the ULG into AS layer sub-groups. New Layer 2 structures and procedures are disclosed to enhance bearer management for Sidelink groupcast communications.

18 Claims, 28 Drawing Sheets

(58) Field of Classification Search
USPC .......................................................... 370/312
See application file for complete search history.

(56) References Cited

U.S. PATENT DOCUMENTS

| | | |
|---|---|---|
| 2017/0048922 A1 | 2/2017 | Lee et al. |
| 2017/0339530 A1 | 11/2017 | Maaref |
| 2018/0249461 A1 | 8/2018 | Miao et al. |
| 2019/0158997 A1 | 5/2019 | Starsinic et al. |
| 2019/0239112 A1 | 8/2019 | Rao et al. |
| 2020/0092685 A1* | 3/2020 | Fehrenbach ............ H04W 4/46 |
| 2020/0366427 A1* | 11/2020 | Wang ..................... H04L 1/1816 |
| 2020/0389257 A1* | 12/2020 | Kung ....................... H04W 4/06 |
| 2021/0045093 A1* | 2/2021 | Rao ......................... H04W 72/04 |
| 2021/0297842 A1 | 9/2021 | Shrivastava |
| 2022/0078818 A1* | 3/2022 | Sun ........................ H04L 67/535 |
| 2022/0132603 A1* | 4/2022 | Adjakple .............. H04W 76/14 |
| 2022/0150730 A1* | 5/2022 | Freda ..................... H04W 76/28 |
| 2023/0422347 A1* | 12/2023 | Li .......................... H04L 5/0048 |

FOREIGN PATENT DOCUMENTS

| | | |
|---|---|---|
| CN | 109479189 A | 3/2019 |
| EP | 2299755 A1 | 3/2011 |
| WO | 2015/163668 A1 | 10/2015 |

OTHER PUBLICATIONS

Qualcomm Incorporated, "Discussion on Groupcast for NR V2X", 3GPP TSG-RAN WG2 Meeting #105, R2-1901727 (revision of R2-1817780), Feb. 25-Mar. 1, 2019, 7 pages.

Zte, "Discussion on PC5 carrier aggregation", R2-1708509, Aug. 2017, 3GPP TSG-RAN WG2 Meeting #99, pp. 6.

* cited by examiner

NR SIDELINK GROUP COMMUNICATION

CROSS-REFERENCE TO RELATED APPLICATIONS

This application is the National Stage Application of International Patent Application No. PCT/US2020/046052, filed Aug. 13, 2020 which claims the benefit of U.S. Provisional Application Ser. No. 62/886,622 (Chen, et al.), filed on Aug. 14, 2019, titled "NR Sidelink Group Communication", the entire contents of which are incorporated by reference herein.

BACKGROUND

In ProSe and specifically in LTE D2D Sidelink communications, One-to-many ProSe Direct Communication has the following characteristics: One-to-many ProSe Direct Communication is connectionless, and thus, there is no signaling over PC5 control plane; the radio layer provides a user plane communication service for transmission of IP packets between UEs engaged in direct communication; members of a group share a secret from which a group security key may be derived to encrypt all user data for that group; authorization for one-to-many ProSe Direct Communication is configured in the UE by the ProSe Function using PC3 reference point; and ProSe UE configuration parameters (e.g., ProSe Group IP multicast addresses, ProSe Group IDs, Group security material, radio related parameters for transmission and reception) are configured in the UE.

SUMMARY

Disclosed herein are methods and systems for NR Sidelink AS group management and bearer management to enhance Sidelink Groupcast communications.

A Sidelink AS group management function is disclosed for a UE to discover group members and organize them into AS layer sub-groups based on the AS layer group context information.

A centralized Sidelink AS group management method is disclosed that the Sidelink AS Group Manager discovers group members and organizes them into AS layer sub-groups for a UE. Two discovery procedures are disclosed that Sidelink AS Group Manager discovers group members and their AS context information via exchanging control messages. A passive discovery procedure is disclosed that a UE sends AS group context information to the SL AS Group Manager via AS Group Context Report. An active discovery procedure is disclosed that SL AS Group Manager sends an AS Group Context Request message to all UEs within a service range. A Subgroup formation and configuration procedure is disclosed that the SL AS Group Manager organizes the ULG into AS layer sub-groups, configures to-UE relays for each UE in the ULG and sends the AS group management information to the UE.

A distributed Sidelink AS group management method is disclosed that each UE discovers its group members and organizes the ULG into AS layer sub-groups. Two distributed AS group discovery procedures are disclosed that a UE discovers group members and obtains their AS context information. A proactive discovery procedure is disclosed that each UE periodically sends its AS group context information to all UE within a service range. A reactive discovery procedure is disclosed that a UE sends discovery requests to and receives discovery response from all UEs within the service range to obtain AS group context information. A Subgroup formation and configuration procedure is disclosed a UE organizes the ULG into AS layer subgroups and configures UE-to-UE relays.

New Layer 2 structures and procedures are disclosed to enhance bearer management for Sidelink groupcast communications. In the first disclosed structure and procedure, a SDAP entity divides the group into subgroups based on the QoS requirement of the groupcast message. Each subgroup has its own layer 2 destination ID and packets associated with different subgroups have separated radio bears. In the second disclosed structure and procedure, a PDCP entity makes the duplications of PDCP PDU based on the number of subgroups and sends the PDU destined to different subgroups to different RLCs. In the third disclosed structure and procedure, the RLC entity makes the duplications of RLC PDU based on the number of subgroups and sends the PDU with different transmission mode to different Logical Channels. In the fourth disclosed structure and procedure, MAC entity makes the duplications of MAC PDU based on the number of subgroups and sends the PDU with different transmission mode to different HARQ entities. In the fifth disclosed structure and procedure, MAC entity makes the duplications of MAC PDU based on the number of subgroups and sends the PDU with different transmission mode with different HARQ processes.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

The following detailed description is better understood when read in conjunction with the appended drawings.

DETAILED DESCRIPTION OF ILLUSTRATIVE EMBODIMENTS

Example Communications System and Networks

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 7 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: Enhanced Mobile Broadband (eMBB) Ultra-Reliable Low-Latency Communication (URLLC), Massive Machine Type Communications (mMTC), network operation (e.g., network slicing, routing, migration and interworking, energy savings), and Enhanced Vehicle-to-Everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive eCall, disaster alerts, real-time gaming, multi-person video calls, autonomous driving, augmented reality, tactile internet, virtual reality, home automation, robotics, and aerial drones to name a few. All of these use cases and others are contemplated herein.

Figure 1A:
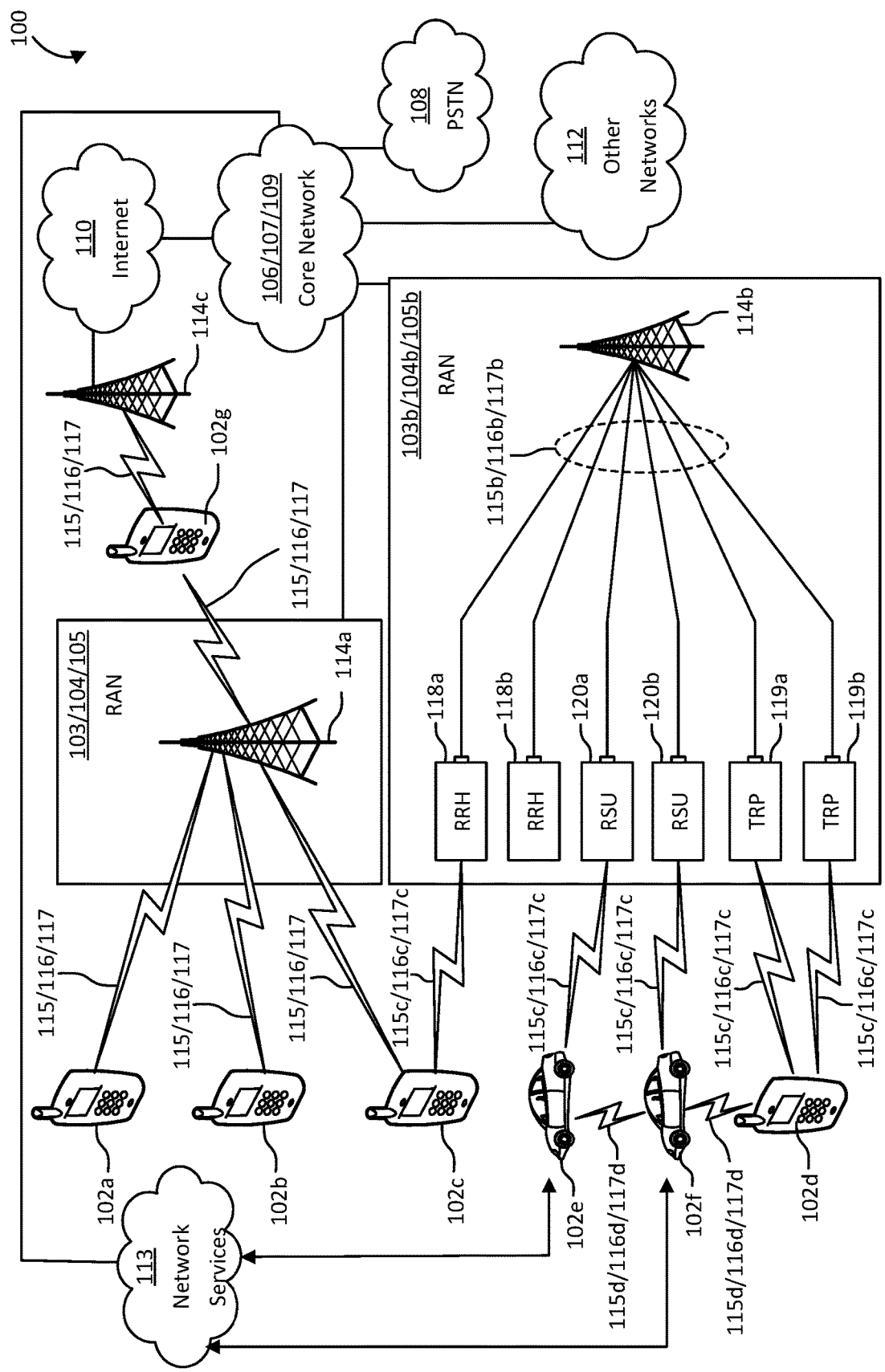
FIG. 1A illustrates an example communications system.

FIG. 1A illustrates an example communications system 100 in which the systems, methods, and apparatuses described and claimed herein may be used. The communications system 100 may include wireless transmit/receive units (WTRUs) 102a, 102b, 102c, 102d, 102e, 102f, and/or 102g, which generally or collectively may be referred to as WTRU 102 or WTRUs 102. The communications system 100 may include, a Radio Access Network (RAN) 103/104/105/103b/104b/105b, a core network 106/107/109, a public switched telephone network (PSTN) 108, the Internet 110, other networks 112, and Network Services 113. 113. Network Services 113 may include, for example, a V2X server, V2X functions, a ProSe server, ProSe functions, IoT services, video streaming, and/or edge computing, etc.

It will be appreciated that the concepts disclosed herein may be used with any number of WTRUs, base stations, networks, and/or network elements. Each of the WTRUs 102 may be any type of apparatus or device configured to operate and/or communicate in a wireless environment. In the example of FIG. 1A, each of the WTRUs 102 is depicted in FIGS. 1A-1E as a hand-held wireless communications apparatus. It is understood that with the wide variety of use cases contemplated for wireless communications, each WTRU may comprise or be included in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus or truck, a train, or an airplane, and the like.

The communications system 100 may also include a base station 114a and a base station 114b. In the example of FIG. 1A, each base stations 114a and 114b is depicted as a single element. In practice, the base stations 114a and 114b may include any number of interconnected base stations and/or network elements. Base stations 114a may be any type of device configured to wirelessly interface with at least one of the WTRUs 102a, 102b, and 102c to facilitate access to one or more communication networks, such as the core network 106/107/109, the Internet 110, Network Services 113, and/or the other networks 112. Similarly, base station 114b may be any type of device configured to wiredly and/or wirelessly interface with at least one of the Remote Radio Heads (RRHs) 118a, 118b, Transmission and Reception Points (TRPs) 119a, 119b, and/or Roadside Units (RSUs) 120a and 120b to facilitate access to one or more communication networks, such as the core network 106/107/109, the Internet 110, other networks 112, and/or Network Services 113. RRHs 118a, 118b may be any type of device configured to wirelessly interface with at least one of the WTRUs 102, e.g., WTRU 102c, to facilitate access to one or more communication networks, such as the core network 106/107/109, the Internet 110, Network Services 113, and/or other networks 112.

TRPs 119a, 119b may be any type of device configured to wirelessly interface with at least one of the WTRU 102d, to facilitate access to one or more communication networks, such as the core network 106/107/109, the Internet 110, Network Services 113, and/or other networks 112. RSUs 120a and 120b may be any type of device configured to wirelessly interface with at least one of the WTRU 102e or 102f, to facilitate access to one or more communication networks, such as the core network 106/107/109, the Internet 110, other networks 112, and/or Network Services 113. By way of example, the base stations 114a, 114b may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114a may be part of the RAN 103/104/105, which may also include other base stations and/or network elements (not shown), such as a Base Station Controller (BSC), a Radio Network Controller (RNC), relay nodes, etc. Similarly, the base station 114b may be part of the RAN 103b/104b/105b, which may also include other base stations and/or network elements (not shown), such as a BSC, a RNC, relay nodes, etc. The base station 114a may be configured to transmit and/or receive wireless signals within a particular geographic region, which may be referred to as a cell (not shown). Similarly, the base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, for example, the base station 114a may include three transceivers, e.g., one for each sector of the cell. The base station 114a may employ Multiple-Input Multiple Output (MIMO) technology and, therefore, may utilize multiple transceivers for each sector of the cell, for instance.

The base station 114a may communicate with one or more of the WTRUs 102a, 102b, 102c, and 102g over an air interface 115/116/117, which may be any suitable wireless communication link (e.g., Radio Frequency (RF), microwave, infrared (IR), ultraviolet (UV), visible light, cmWave, mmWave, etc.). The air interface 115/116/117 may be established using any suitable Radio Access Technology (RAT).

The base station 114b may communicate with one or more of the RRHs 118a and 118b, TRPs 119a and 119b, and/or RSUs 120a and 120b, over a wired or air interface 115b/116b/117b, which may be any suitable wired (e.g., cable, optical fiber, etc.) or wireless communication link (e.g., RF, microwave, IR, UV, visible light, cmWave, mmWave, etc.). The air interface 115b/116b/117b may be established using any suitable RAT.

The RRHs 118a, 118b, TRPs 119a, 119b and/or RSUs 120a, 120b, may communicate with one or more of the WTRUs 102c, 102d, 102e, 102f over an air interface 115c/116c/117c, which may be any suitable wireless communication link (e.g., RF, microwave, IR, ultraviolet UV, visible light, cmWave, mmWave, etc.) The air interface 115c/116c/117c may be established using any suitable RAT.

The WTRUs 102 may communicate with one another over a direct air interface 115d/116d/117d, such as Sidelink communication which may be any suitable wireless communication link (e.g., RF, microwave, IR, ultraviolet UV, visible light, cmWave, mmWave, etc.) The air interface 115d/116d/117d may be established using any suitable RAT.

The communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b, TRPs 119a, 119b and/or RSUs 120a and 120b in the RAN 103b/104b/105b and the WTRUs 102c, 102d, 102e, and 102f, may implement a radio technology such as Universal Mobile Telecommunications System (UMTS) Terrestrial Radio Access (UTRA), which may establish the air interface 115/116/117 and/or 115c/116c/117c respectively using Wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

The base station 114a in the RAN 103/104/105 and the WTRUs 102a, 102b, 102c, and 102g, or RRHs 118a and 118b, TRPs 119a and 119b, and/or RSUs 120a and 120b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A), for example. The air interface 115/116/117 or 115c/116c/117c may implement 3GPP NR technology. The LTE and LTE-A technology may include LTE D2D and/or V2X technologies and interfaces (such as Sidelink communications, etc.) Similarly, the 3GPP NR technology may include NR V2X technologies and interfaces (such as Sidelink communications, etc.)

The base station 114a in the RAN 103/104/105 and the WTRUs 102a, 102b, 102c, and 102g or RRHs 118a and 118b, TRPs 119a and 119b, and/or RSUs 120a and 120b in the RAN 103b/104b/105b and the WTRUs 102c, 102d, 102e, and 102f may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 1A may be a wireless router, Home Node B, Home eNode B, or access point, for example, and may utilize any suitable RAT for facilitating wireless connectivity in a localized area, such as a place of business, a home, a vehicle, a train, an aerial, a satellite, a manufactory, a campus, and the like. The base station 114c and the WTRUs 102, e.g., WTRU 102e, may implement a radio technology such as IEEE 802.11 to establish a Wireless Local Area Network (WLAN). Similarly, the base station 114c and the WTRUs 102, e.g., WTRU 102d, may implement a radio technology such as IEEE 802.15 to establish a Wireless Personal Area Network (WPAN). The base station 114c and the WTRUs 102, e.g., WRTU 102e, may utilize a cellular-based RAT (e.g., WCDMA, CDMA2000, GSM, LTE, LTE-A, NR, etc.) to establish a picocell or femtocell. As shown in FIG. 1A, the base station 114c may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, messaging, authorization and authentication, applications, and/or Voice Over Internet Protocol (VoIP) services to one or more of the WTRUs 102. For example, the core network 106/107/109 may provide call control, billing services, mobile location-based services, pre-paid calling, Internet connectivity, packet data network connectivity, Ethernet connectivity, video distribution, etc., and/or perform high-level security functions, such as user authentication.

Although not shown in FIG. 1A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM or NR radio technology.

The core network 106/107/109 may also serve as a gateway for the WTRUs 102 to access the PSTN 108, the Internet 110, and/or other networks 112. The PSTN 108 may include circuit-switched telephone networks that provide Plain Old Telephone Service (POTS). The Internet 110 may include a global system of interconnected computer networks and devices that use common communication protocols, such as the Transmission Control Protocol (TCP), User Datagram Protocol (UDP), and the Internet Protocol (IP) in the TCP/IP Internet Protocol suite. The other networks 112 may include wired or wireless communications networks owned and/or operated by other service providers. For example, the networks 112 may include any type of packet data network (e.g., an IEEE 802.3 Ethernet network) or another core network connected to one or more RANs, which may employ the same RAT as the RAN 103/104/105 and/or RAN 103b/104b/105b or a different RAT.

Some or all of the WTRUs 102a, 102b, 102c, 102d, 102e, and 102f in the communications system 100 may include multi-mode capabilities, e.g., the WTRUs 102a, 102b, 102c, 102d, 102e, and 102f may include multiple transceivers for communicating with different wireless networks over different wireless links. For example, the WTRU 102g shown in FIG. 1A may be configured to communicate with the base station 114a, which may employ a cellular-based radio technology, and with the base station 114c, which may employ an IEEE 802 radio technology.

Although not shown in FIG. 1A, it will be appreciated that a User Equipment may make a wired connection to a gateway. The gateway may be a Residential Gateway (RG). The RG may provide connectivity to a Core Network 106/107/109. It will be appreciated that many of the ideas contained herein may equally apply to UEs that are WTRUs and UEs that use a wired connection to connect to a network. For example, the ideas that apply to the wireless interfaces 115, 116, 117 and 115c/116c/117c may equally apply to a wired connection.

Figure 1B:
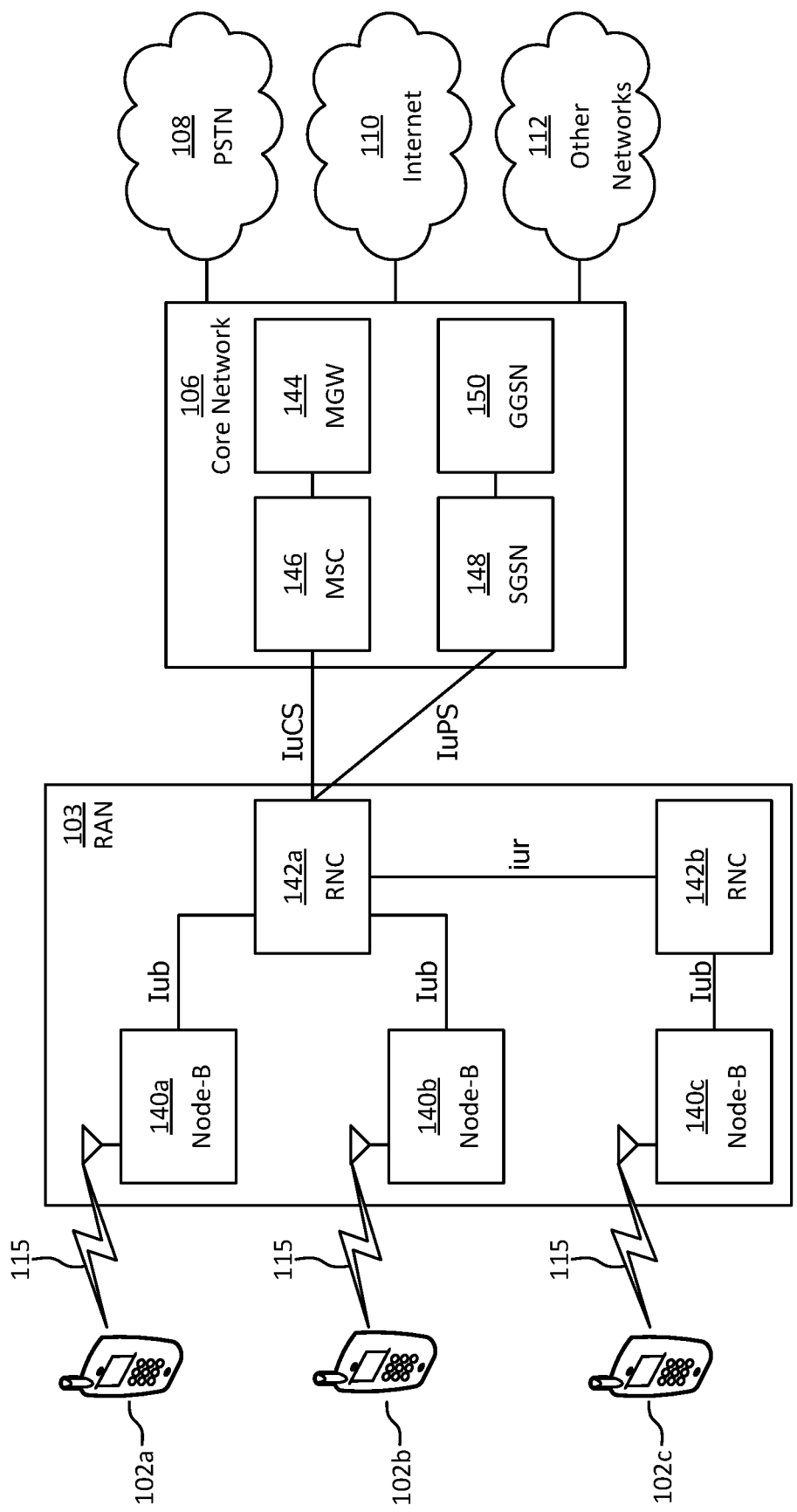
FIGS. 1B, 1C, and 1D are system diagrams of example RANs and core networks.

FIG. 1B is a system diagram of an example RAN 103 and core network 106. As noted above, the RAN 103 may employ a UTRA radio technology to communicate with the WTRUs 102a, 102b, and 102c over the air interface 115. The RAN 103 may also be in communication with the core network 106. As shown in FIG. 1B, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a, 142b. It will be appreciated that the RAN 103 may include any number of Node-Bs and Radio Network Controllers (RNCs.)

As shown in FIG. 1B, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 142a and 142b may be configured to control the respective Node-Bs 140a, 140b, and 140c to which it is connected. In addition, each of the RNCs 142a and 142b may be configured to carry out or support other functionality, such as outer loop power control, load control, admission control, packet scheduling, handover control, macro-diversity, security functions, data encryption, and the like.

The core network 106 shown in FIG. 1B may include a media gateway (MGW) 144, a Mobile Switching Center (MSC) 146, a Serving GPRS Support Node (SGSN) 148, and/or a Gateway GPRS Support Node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned and/or operated by other service providers.

Figure 1C:
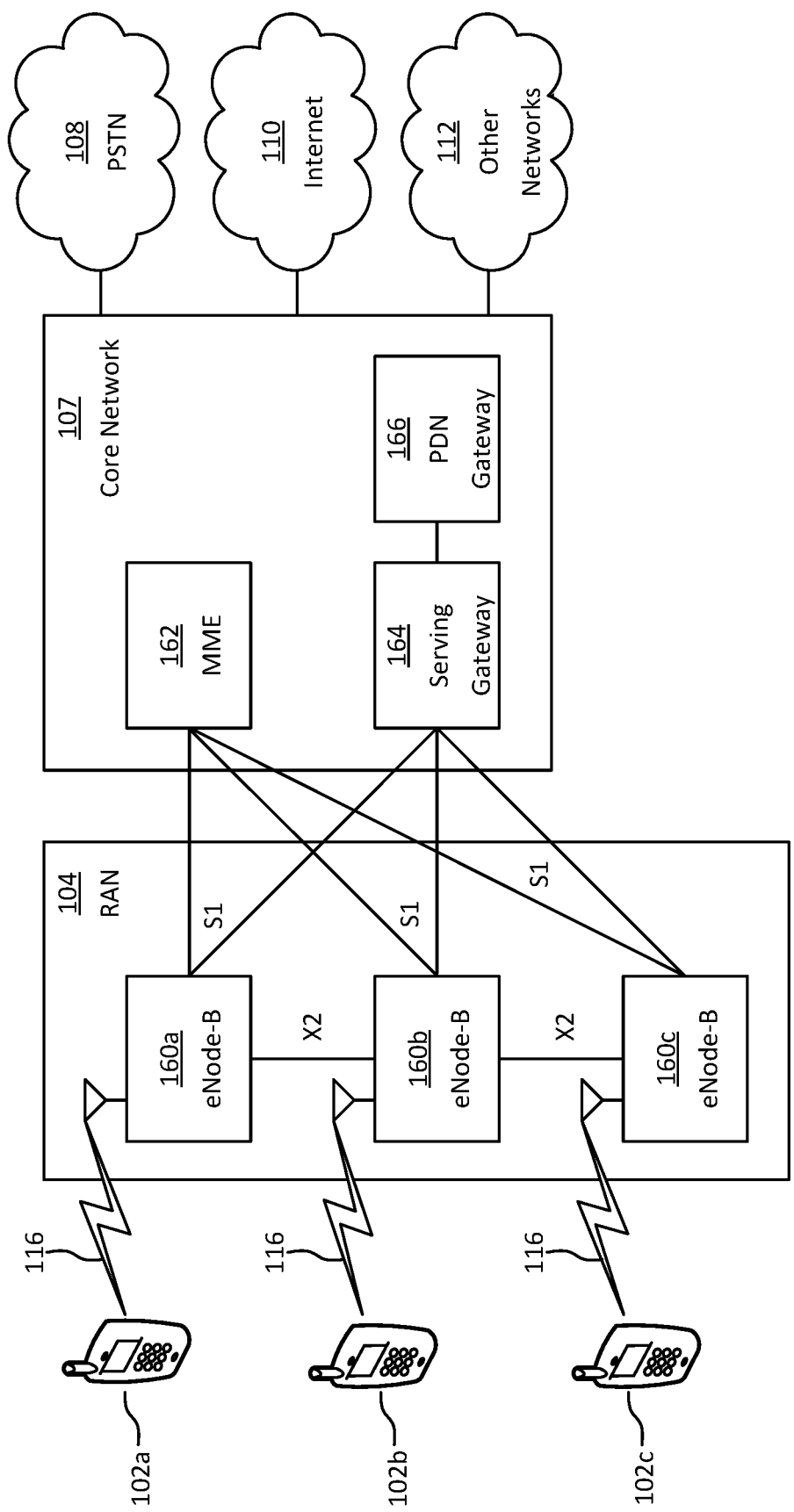

FIG. 1C is a system diagram of an example RAN 104 and core network 107. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 1C, the eNode-Bs 160a, 160b, and 160c may communicate with one another over an X2 interface.

The core network 107 shown in FIG. 1C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned and/or operated by other service providers.

Figure 1D:
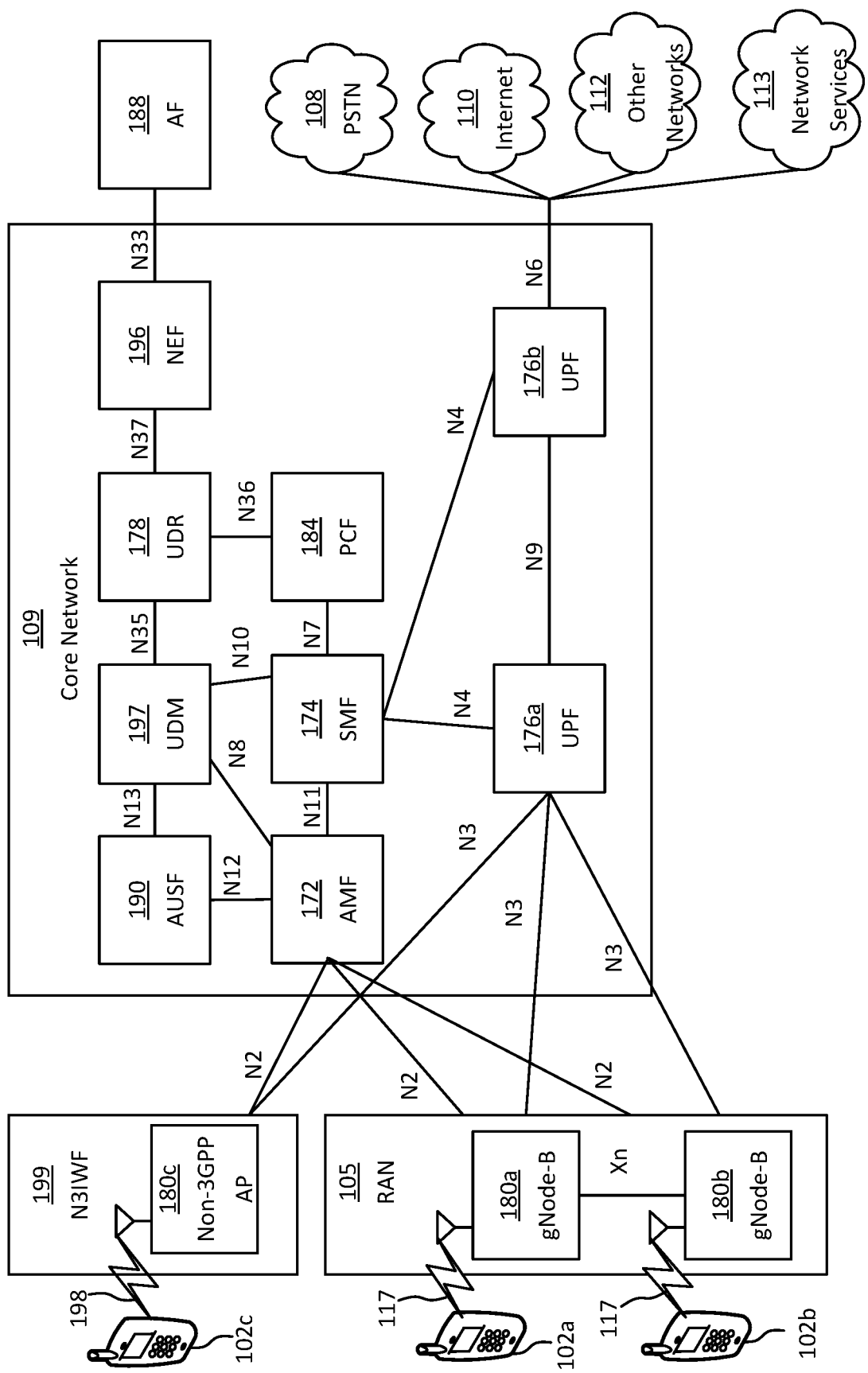

FIG. 1D is a system diagram of an example RAN 105 and core network 109. The RAN 105 may employ an NR radio technology to communicate with the WTRUs 102a and 102b over the air interface 117. The RAN 105 may also be in communication with the core network 109. A Non-3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It will be appreciated that the RAN 105 may include any number of gNode-Bs. The gNode-Bs 180a and 180b may each include one or more transceivers for communicating with the WTRUs 102a and 102b over the air interface 117. When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, and/or digital beamforming technology. Thus, the gNode-B 180a, for example, may use multiple antennas to transmit wireless signals to, and receive wireless signals from, the WTRU 102a. It should be appreciated that the RAN 105 may employ of other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180c. It will be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink and/or downlink, and the like. As shown in FIG. 1D, the gNode-Bs 180a and 180b may communicate with one another over an Xn interface, for example.

The core network 109 shown in FIG. 1D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless and/or network communications or a computer system, such as system 90 illustrated in Figure x1G.

In the example of FIG. 1D, the 5G Core Network 109 may include an access and Access and Mobility Management Function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned and/or operated by an entity other than the core network operator. It will also be appreciated that a 5G core network may not consist of all of these elements, may consist of additional elements, and may consist of multiple instances of each of these elements. FIG. 1D shows that network functions directly connect to one another, however, it should be appreciated that they may communicate via routing agents such as a diameter routing agent or message buses.

In the example of FIG. 1D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, and access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface is not shown in FIG. 1D.

The SMF 174 may be connected to the AMF 172 via an N11 interface. Similarly, the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF 176b may provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102c and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 1D. The PCF 184 may provide policy rules to control plane nodes such as the AMF 172 and SMF 174, allowing the control plane nodes to enforce these rules. The PCF 184 may send policies to the AMF 172 for the WTRUs 102a, 102b, and 102c so that the AMF may deliver the policies to the WTRUs 102a, 102b, and 102c via an N1 interface. Policies may then be enforced, or applied, at the WTRUs 102a, 102b, and 102c.

The UDR 178 may act as a repository for authentication credentials and subscription information. The UDR may connect to network functions, so that network function can add to, read from, and modify the data that is in the repository. For example, the UDR 178 may connect to the PCF 184 via an N36 interface. Similarly, the UDR 178 may connect to the NEF 196 via an N37 interface, and the UDR 178 may connect to the UDM 197 via an N35 interface.

The UDM 197 may serve as an interface between the UDR 178 and other network functions. The UDM 197 may authorize network functions to access of the UDR 178. For example, the UDM 197 may connect to the AMF 172 via an N8 interface, the UDM 197 may connect to the SMF 174 via an N10 interface. Similarly, the UDM 197 may connect to the AUSF 190 via an N13 interface. The UDR 178 and UDM 197 may be tightly integrated.

The AUSF 190 performs authentication related operations and connects to the UDM 178 via an N13 interface and to the AMF 172 via an N12 interface.

The NEF 196 exposes capabilities and services in the 5G core network 109 to Application Functions (AF) 188. Exposure may occur on the N33 API interface. The NEF may connect to an AF 188 via an N33 interface and it may connect to other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 1D, in a network slicing scenario, a WTRU 102a, 102b, or 102c may connect to an AMF 172, via an N1 interface. The AMF may be logically part of one or more slices. The AMF may coordinate the connection or communication of WTRU 102a, 102b, or 102c with one or more UPF 176a and 176b, SMF 174, and other network functions. Each of the UPFs 176a and 176b, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102a, 102b, and 102c and servers or applications functions 188. In addition, the core network 170 may provide the WTRUs 102a, 102b, and 102c with access to the networks 112, which may include other wired or wireless networks that are owned and/or operated by other service providers.

The core network entities described herein and illustrated in FIGS. 1A, 1C, 1D, and 1E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 1A, 1B, 1C, 1D, and 1E are provided by way of example only, and it is understood that the subject matter disclosed and claimed herein may be embodied or implemented in any similar communication system, whether presently defined or defined in the future.

Figure 1E:
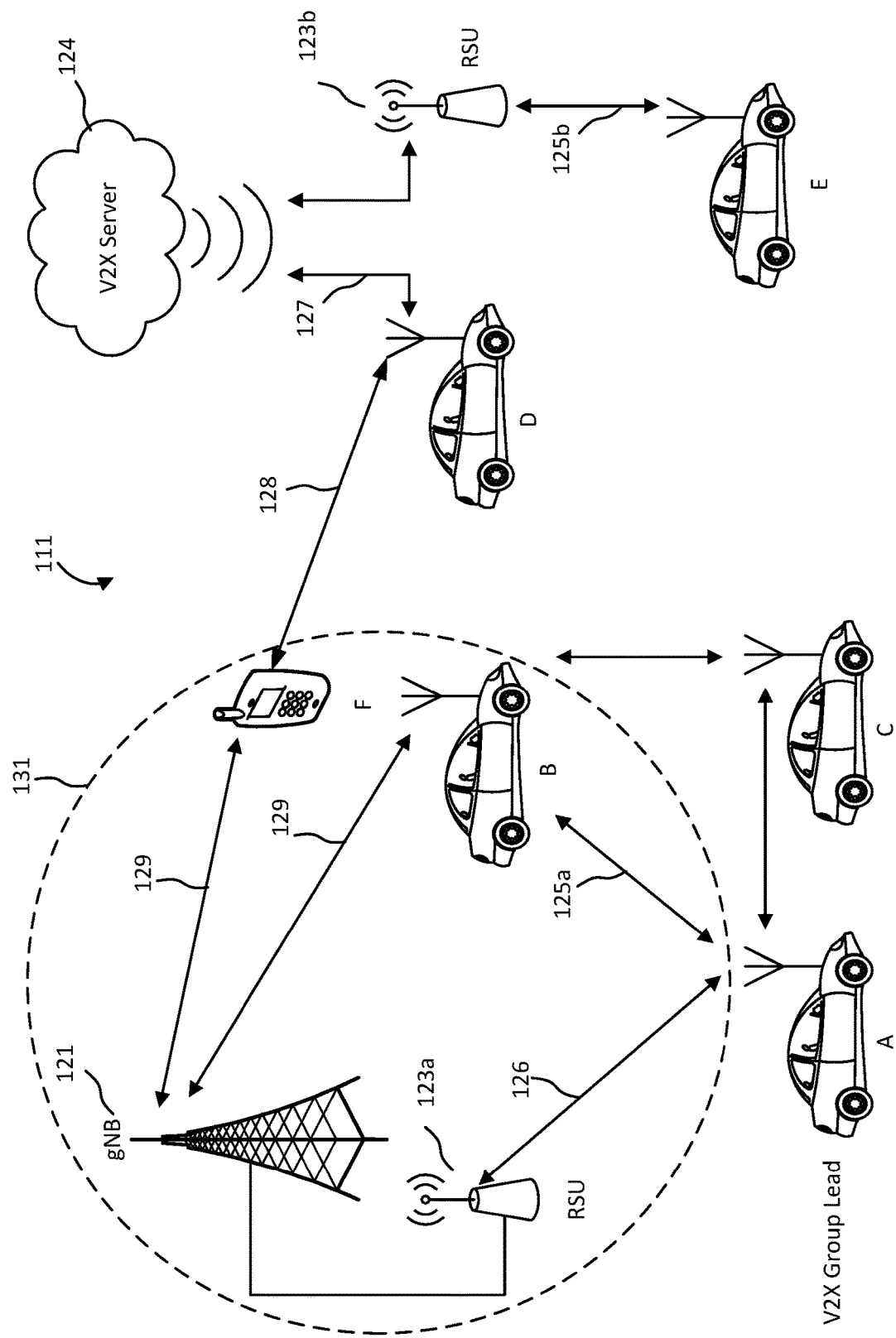
FIG. 1E illustrates another example communications system.

FIG. 1E illustrates an example communications system 111 in which the systems, methods, apparatuses described herein may be used. Communications system 111 may include Wireless Transmit/Receive Units (WTRUs) A, B, C, D, E, F, a base station gNB 121, a V2X server 124, and Roadside Units (RSUs) 123a and 123b. In practice, the concepts presented herein may be applied to any number of WTRUs, base station gNBs, V2X networks, and/or other network elements. One or several or all WTRUs A, B, C, D, E, and F may be out of range of the access network coverage 131. WTRUs A, B, and C form a V2X group, among which WTRU A is the group lead and WTRUs B and C are group members.

WTRUs A, B, C, D, E, and F may communicate with each other over a Uu interface 129 via the gNB 121 if they are within the access network coverage 131. In the example of FIG. 1E, WTRUs B and F are shown within access network coverage 131. WTRUs A, B, C, D, E, and F may communicate with each other directly via a Sidelink interface (e.g., PC5 or NR PC5) such as interface 125a, 125b, or 128, whether they are under the access network coverage 131 or out of the access network coverage 131. For instance, in the example of FIG. 1E, WRTU D, which is outside of the access network coverage 131, communicates with WTRU F, which is inside the coverage 131.

WTRUs A, B, C, D, E, and F may communicate with RSU 123a or 123b via a Vehicle-to-Network (V2N) 133 or Sidelink interface 125b. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 1F:
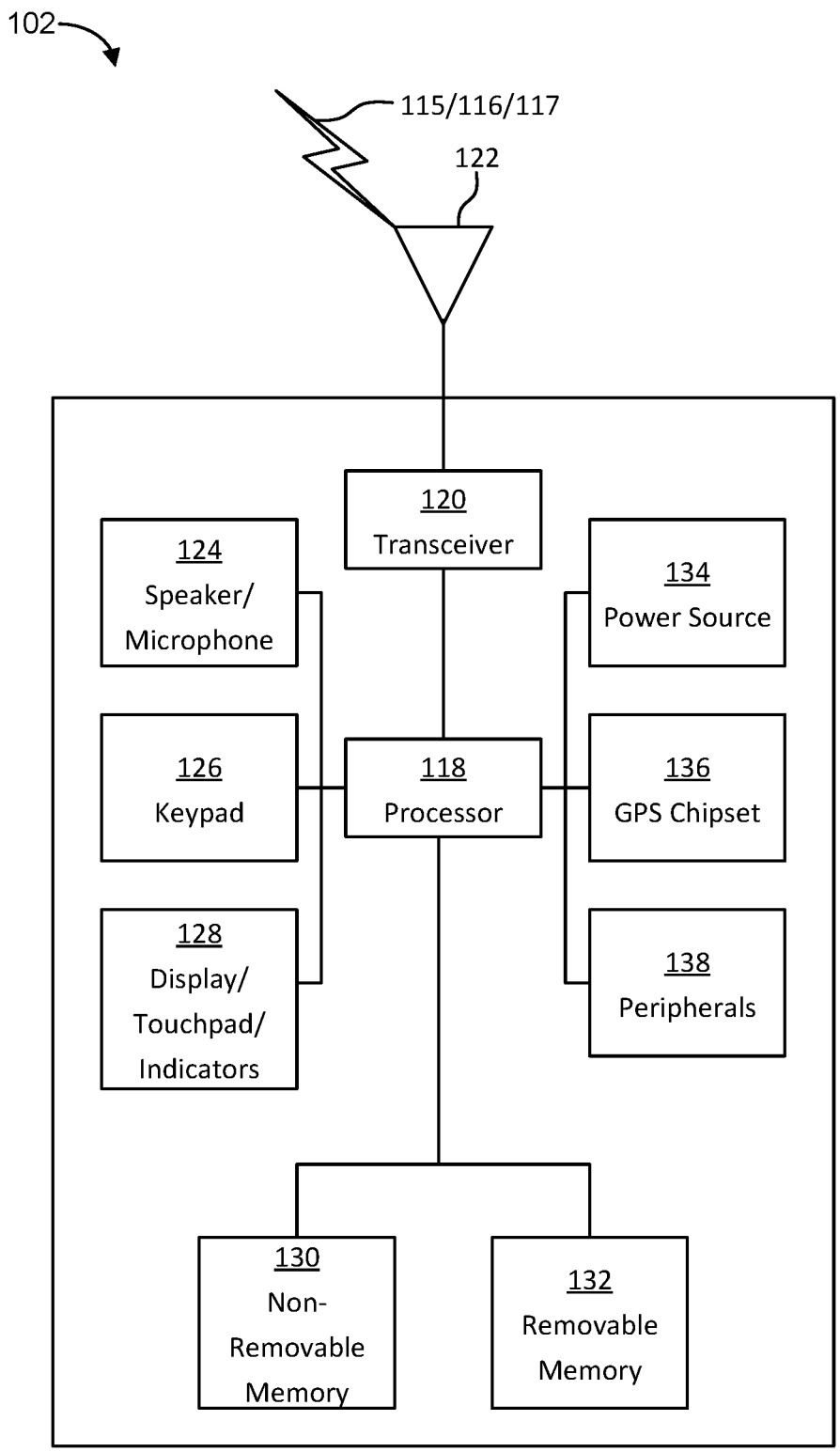
FIG. 1F is a block diagram of an example apparatus or device, such as a WTRU.

FIG. 1F is a block diagram of an example apparatus or device WTRU 102 that may be configured for wireless communications and operations in accordance with the systems, methods, and apparatuses described herein, such as a WTRU 102 of FIG. 1A, 1B, 1C, 1D, or 1E. As shown in FIG. 1F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any subcombination of the foregoing elements. Also, the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 1F and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114a of FIG. 1A) over the air interface 115/116/117 or another UE over the air interface 115d/116d/117d. For example, the transmit/receive element 122 may be an antenna configured to transmit and/or receive RF signals. The transmit/receive element 122 may be an emitter/detector configured to transmit and/or receive IR, UV, or visible light signals, for example. The transmit/receive element 122 may be configured to transmit and receive both RF and light signals. It will be appreciated that the transmit/receive element 122 may be configured to transmit and/or receive any combination of wireless or wired signals.

In addition, although the transmit/receive element 122 is depicted in FIG. 1F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, and/or the display/touchpad/indicators 128 (e.g., a liquid crystal display (LCD)) display unit or organic light-emitting diode (OLED) display unit. The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or an edge computing platform or in a home computer (not shown).

The processor 118 may receive power from the power source 134 and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software and/or hardware modules that provide additional features, functionality, and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect to other components, modules, or systems of such apparatuses or devices via one or more interconnect interfaces, such as an interconnect interface that may comprise one of the peripherals 138.

Figure 1G:
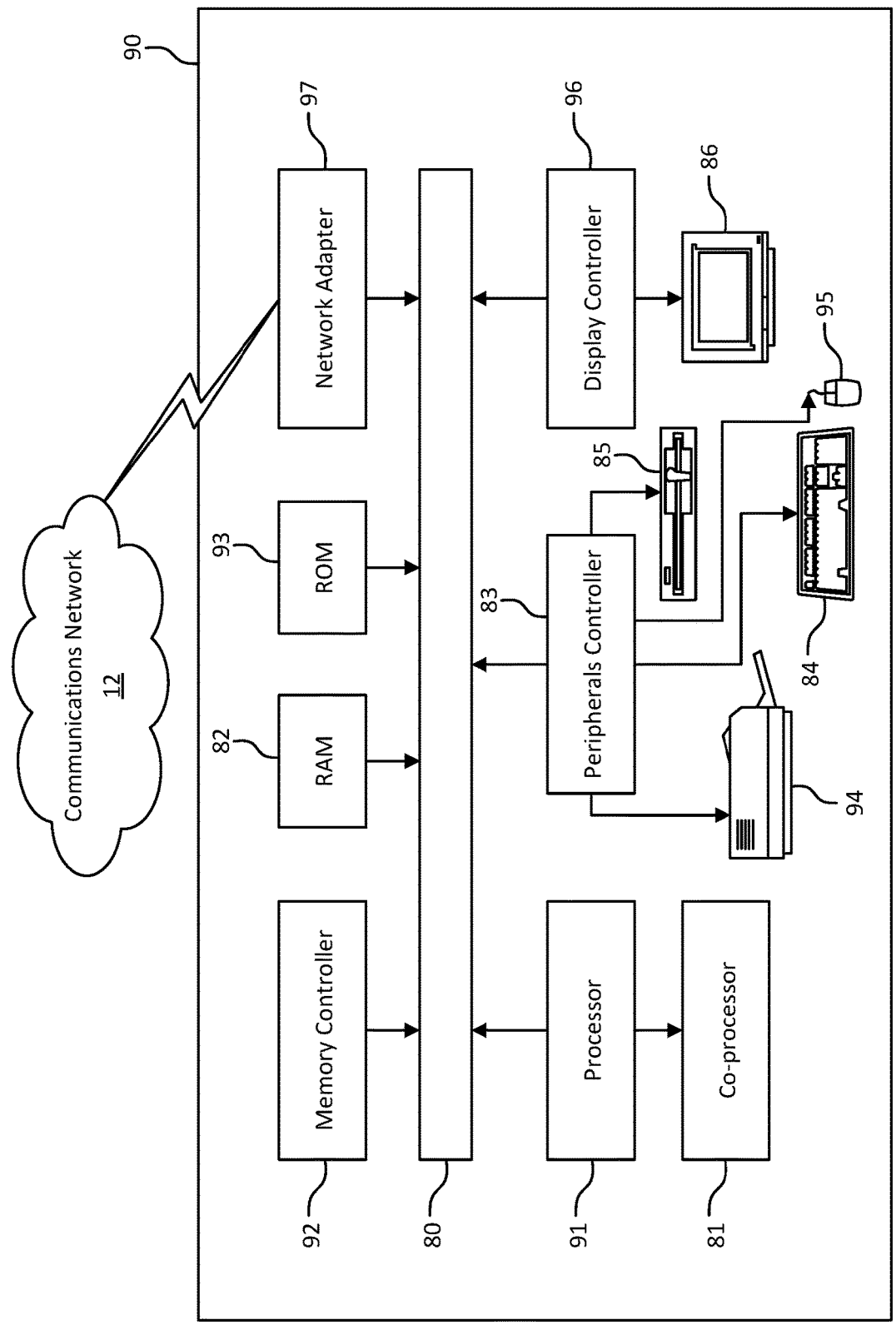
FIG. 1G is a block diagram of an exemplary computing system.

FIG. 1G is a block diagram of an exemplary computing system 90 in which one or more apparatuses of the communications networks illustrated in FIGS. 1A, 1C, 1D, and 1E may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIGS. 1A, 1B, 1C, 1D, and 1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods, and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations, or functions described herein may be implemented in the form of such computer executable instructions, executing on the processor of an apparatus or computing system configured for wireless and/or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

PC5 Reference Point

The V2X communication over PC5 reference point is a type of ProSe Direct Communication where the V2X communication over PC5 reference point is connectionless, and there is no signaling over PC5 control plane for connection establishment. V2X messages are exchanged between UEs over PC5 user plane.

NR V2X Sidelink Use Case

In NR V2X, Vehicles Platooning enables the vehicles to form a group traveling together dynamically. All the vehicles in the platoon receive periodic data from the leading vehicle to carry on platoon operations. This information allows the distance between vehicles to become extremely small, e.g., the gap distance translated to time can be very low (sub-second). Platooning applications may allow the vehicles following to be autonomously driven. In TS 22.186, it is stated that for vehicle platooning, the 3GPP system shall be able to support reliable V2V communications between a specific UE supporting V2X applications and up to 19 other UEs supporting V2X applications. This requires extended UE-to-UE communication range. UE-to-UE relay can help to provide reliable V2V communications in the long platoon (see 3GPP TS 22.186, Enhancement of 3GPP support for V2X scenarios; Stage 1 (Release 15), V16.0.0).

In V2X, application on vehicles can form a group in the proximity, and each member may groupcast application data to other members in the group. In TS 22.886, it is stated that for data sharing use cases, the 3GPP system shall be able to support less than 10 ms latency message and reliability of 90% between V2X applications (see 3GPP TR 22.886, Study on enhancement of 3GPP Support for 5GV2X Services; (Release 15), V15.1.0).

NR Device-to-Device Sidelink Use case

In NR, UEs in an indoor environment may have coverage problem due to penetration loss or shadowing. Therefore, a special cooperative UE (CUE) could be installed outdoor and has more advanced transmit/reception capability than a normal UE. The CUE and indoor UE(s) could form UE group, and the CUE helps with the indoor target UE (TUE) to improve DL/UL performance by relaying their data on SL. For example, when a gNB broadcast/multicast message to all UEs in the group, the gNB can send the message to CUE and the CUE can broadcast/multicast to all UEs in the group.

In NR, Smartphones or new forms of 5G portable devices (e.g., VR/AR devices, robot, etc.) can form a group for entertainment and education (e.g., interactive gaming or conferences) over PC5 interface. For example, in a gaming group, a group member interacts with all other group members with low End-to-End latency and high data rate.

Example Challenges

As discussed above, a group may be managed by the upper layer, e.g. the V2X layer or applications. Therefore, the group context information may not be visible to RAN/AS layer or may have only limited information visible such as the ID of group members. However, without AS level group context information, the AS may not be able to support the diverse and stringent Sidelink QoS requirement for upper layer groupcast as described in the following examples.

Limited groupcast range: Without the AS topology information, AS layer groupcast is limited to one AS level hop. Note in this disclosure, we assume there is no PHY layer relay. Therefore, a AS level hop is the same as a PHY layer hop. However, the Upper Layer Group (ULG) may be beyond one AS level hop. Therefore, AS layer groupcast may not be able to deliver a groupcast message to all members in the group or within a service range that is bigger than one AS level hop. For example, in V2X vehicle platooning with up to 19 UEs, the platoon lead and the vehicle at the edge may be located within one hop communication range. Therefore, without AS level group management to manage the topology of the group and configure relays, the platoon lead cannot groupcast a message to all members of the group.

Cannot Fulfill QoS requirements: The upper layer usually forms a group that does not consider the AS context information. Therefore, without AS management of ULG, the groupcast message cannot be delivered to meet the stringent QoS requirement. For example, antenna arrays are supported in NR, a UE may use different communication modes to transmit a message at AS layer with different transmission range. A UE can broadcast/multicast a message to all receivers in all directions within a short-range using a (quasi)omni directional antenna pattern. On the other hand, a UE can unicast a message to receivers in a cone with a specific direction but within a longer range. If the AS layer uses broadcast/multicast to transmit a groupcast message, a group member cannot receive it if the group member is out of the transmission range. On the other hand, if the AS layer uses unicast to transmit a message, it needs to transmit it multiple times since group members may not be in the same cone. Therefore, without AS layer distance and direction information, the AS cannot decide which transmission mode to use to transmit a groupcast message from the upper layer. By obtaining the AS context information, AS can know the group members that are in the multicast range and unicast range. AS can deliver the groupcast message to group members in the multicast range via a multicast transmission and to group members in the unicast range via several unicast transmissions. This can reduce the latency and guarantee the reliability to transmit an upper layer groupcast message. Therefore, it is helpful for AS has group management capability by dividing an ULG into several AS subgroups based on AS context to enhance the performance of a groupcast transmission.

Moreover, the existing layer 2 protocol structure cannot support some new groupcast features in NR. For example, the existing layer 2 protocol structure cannot support both groupcast feedback options and decide which feedback option to use. In another example, the existing layer 2 protocol structure cannot support multiple transmission modes to transmit a groupcast message. If a group member fails to receive a groupcast message via multicast when it moves out of multicast transmission range, layer 2 cannot dynamically retransmit the groupcast message to the UE via unicast.

Disclosed herein are methods and systems for NR Sidelink AS group management and bearer management to enhance Sidelink Groupcast communications.

A Sidelink AS group management function is disclosed for a UE to discover group members and organize them into AS layer sub-groups based on the AS layer group context information.

A centralized Sidelink AS group management is disclosed that the Sidelink AS Group Manager discovers group members and organizes them into AS layer sub-groups for a UE. Two discovery procedures are disclosed that Sidelink AS Group Manager discovers group members and their AS context information via exchanging control messages. A passive discovery procedure is disclosed that a UE sends AS group context information to the SL AS Group Manager via AS Group Context Report. An active discovery procedure is disclosed that SL AS Group Manager sends an AS Group Context Request message to all UEs within a service range. A Subgroup formation and configuration procedure is disclosed that SL AS Group Manager organizes the ULG into AS layer sub-groups, configures UE-to-UE relays for each UE in the ULG and sends the AS group management information to the UE.

A distributed Sidelink AS group management method is disclosed that each UE discovers its group members and organizes the ULG into AS layer sub-groups. Two distributed AS group discovery procedures are disclosed that a UE discovers group members and obtains their AS context information. A proactive discovery procedure is disclosed that each UE periodically sends its AS group context information to all UE within a service range. A reactive discovery procedure is disclosed that a UE sends discovery requests to and receives discovery response from all UEs within the service range to obtain AS group context information. A Subgroup formation and configuration procedure is disclosed a UE organizes the ULG into AS layer subgroups and configures UE-to-UE relays.

New Layer 2 structures and procedures are disclosed to enhance bearer management for Sidelink groupcast communications. In the first disclosed structure and procedure, SDAP entity divides the group into subgroups based on the QoS requirement of the groupcast message. Each subgroup has its own layer 2 destination ID and packets associated with different subgroups have separated radio bears. In the second disclosed structure and procedure, PDCP entity makes the duplications of PDCP PDU based on the number of subgroups and sends the PDU destined to different subgroups to different RLCs. In the third disclosed structure and procedure, the RLC entity makes the duplications of RLC PDU based on the number of subgroups and sends the PDU with different transmission mode to different Logical Channels. In the fourth disclosed structure and procedure, MAC entity makes the duplications of MAC PDU based on the number of subgroups and sends the PDU with different transmission mode to different HARQ entities. In the fifth disclosed structure and procedure, MAC entity makes the duplications of MAC PDU based on the number of subgroups and sends the PDU with different transmission mode with different HARQ processes.

Example of the Four Devices

For example, a number of concepts described herein can be described in terms of five devices: a first device which is a transmitter; a second device that configures the first device; a third device that is downstream or upstream from the first device and uses it a relay; a fourth device which is an AS group manager.

The first device includes stored instructions which cause the first device to receive a groupcast packet, receive information about a first group of devices for the transmission of the groupcast packet, perform mapping of the first group of devices to one or more second groups of devices, select a second group of devices, and transmit the groupcast packet to the second groups of devices.

The first device may be configured by the second device, which sends information such as: an AS ID of the transmitter; an upper layer ID of an Upper Layer Group (ULG) to which the transmitter belongs; an AS ID associated with the ULG; and a capability of the transmitter to forward control plane and user plane packet to a third device within a range.

The second device may be a base station, RSU, another UE, Core Network node or combination of such devices.

The first device may be preconfigured, e.g., as specified by standards or otherwise provided, with such parameters as: an AS ID of the first device; an Upper Layer ID of the ULG; an AS ID associated with the ULG; and the capability of the first device to forward control plane and user plane packet to a third device within a range.

The first device may receive the groupcast packet from the upper layer of the first device or from the upstream device.

The first device may receive information about the first group of devices from the upper layer of the first device, and the first group of devices may be a group of upper layer devices. The information may include an ULG ID, QoS requirement, group size, or member ID in the group.

The first device may check whether a mapping rule exists to fulfill the ULG groupcast requirement based on current AS context information.

The first device may perform an AS group management procedure to generate one or more mapping rules. In doing so, the first device may send a group management request to the AS group manager.

The AS group manager may receive AS group context information via one or more AS group context report messages, where the group context report message contains information listed in Table 2, such as an AS ID of the reporting UE, an AS ID of the group manager, a sequence number, a position, a maximum number of forwarding, maximum forward physical range, AS group context information, AS IDs of relay UEs traversed, and capability of a relay UE traversed, wherein the AS group context information includes items such as AS group IDs, relay capability, AS group context information of neighbors. The AS group manager may then send an AS Group Context report response which contains the AS ID of each relay device on the path.

The AS group manager may send an AS group context request message to all devices within a service range periodically or receive a group management request message from another device in the network.

The AS group manager may generate mapping rules, and may configure relays for devices and send the AS subgroup configuration information to a UE via dedicated control messages, wherein the message contains AS Group Management Information listed in Table 6, such as ULG member, Path to ULG member and Management Information of AS subgroup Group listed in Table 7.

When the first device sends a group management request and AS Group Context Report messages to the AS group manager, where the group context report message contains information such as that listed in Table 2. The first device may then receive a Group Context Report response from the AS group manager containing an AS ID of each relay device on the path.

The first device may perform a distributed group management procedure that includes: sending AS group context information to all devices within a service range via AS Group Context Advertisement messages; sending discovery requests to, and receives discovery response from, all devices within the service range to obtain AS group context information; generating mapping rule, configuring relays for devices and sends the AS subgroup configuration information to the UE via dedicated control messages; and send groupcast data message to each subgroup of the ULG.

The first device may determine whether to execute the mapping. For example, the first device may determine whether to execute the mapping based on information contained in a control message and a capability of the first device to forward control plane and user plane packets.

The first device may determine whether to execute the mapping based on information contained in a packet containing a data message and a configuration received from another device.

The first device may select a second group of devices using information contained the packet message and a configuration received from another device.

The first device may select a transmission method based on properties of the second group, such as distances between devices in the group and the number of devices in the group.

The first device may allocate resources for the transmission based on the selected transmission method.

The first device may select a HARQ method based on the properties of the second group. In doing so, the first device may indicate which devices of the second group should send back an acknowledgement, or a negative acknowledgement upon failing to receive the packet.

Architecture and Overview

In this section, an SL AS group management framework is disclosed to support a UE to transmit an upper layer groupcast message, which has diverse and stringent Sidelink QoS requirement, to all group members within a service range that may be bigger than one hop. The SL AS group management framework includes SL group management functions in the control plane and SL groupcast bearer management in the user plane.

Figure 2:
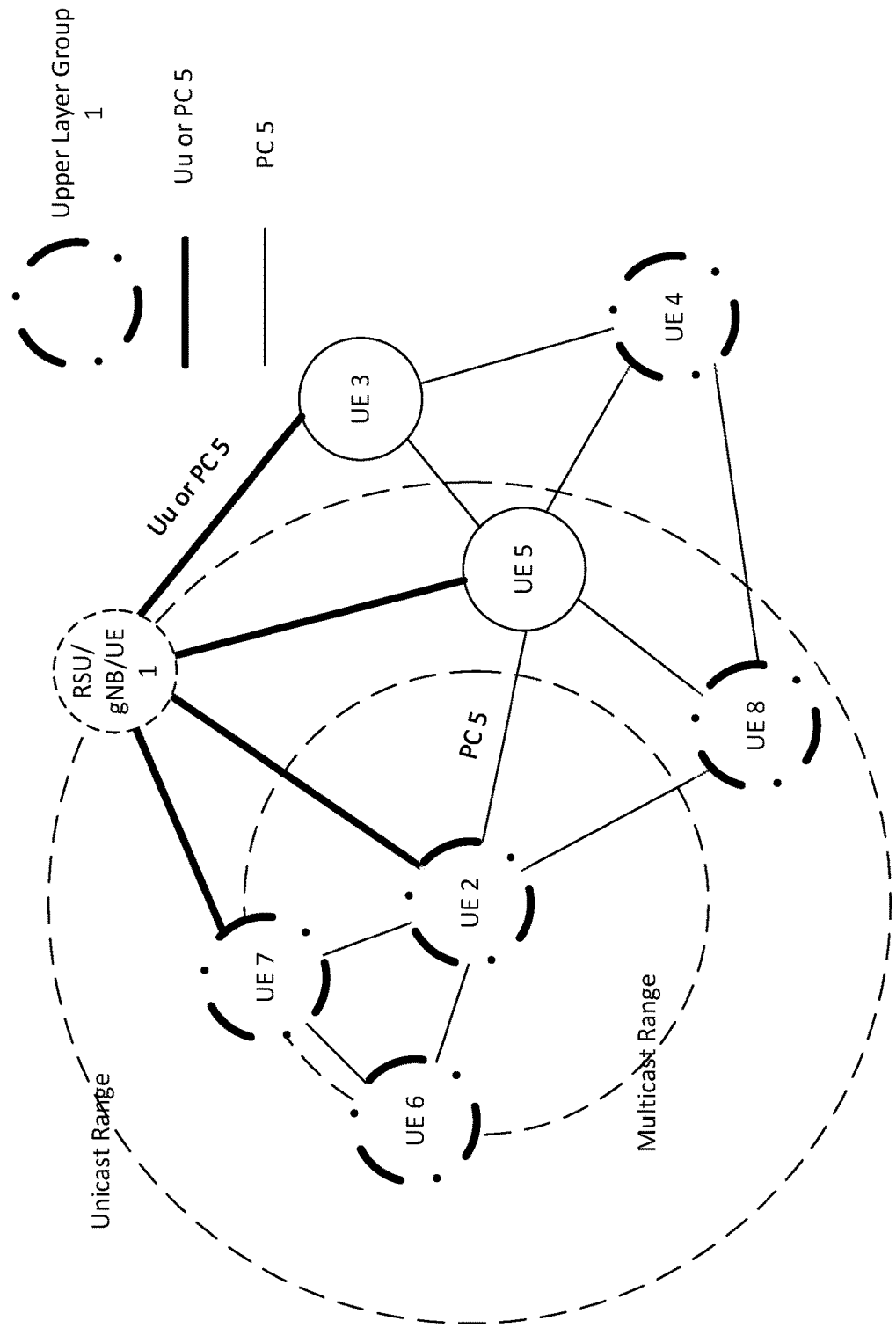
FIG. 2 shows an example topology for an SL AS group management framework.

FIG. 2 shows an example of topology to illustrate the disclosed framework. In FIG. 2, UE 2, 4, 6, 7, and 8 are in the same Upper Layer Group (ULG), e.g., ULG 1. UE 2 receives an upper layer groupcast message and intends to transmit it to all UEs in ULG 1. There may be an RSU, gNB or scheduling UE in the network. There are also some UEs which support layer 2 or layer 3 relay function as UE 3 and UE 5 shown in FIG. 2.

SL AS Group Management Function

Figure 3:
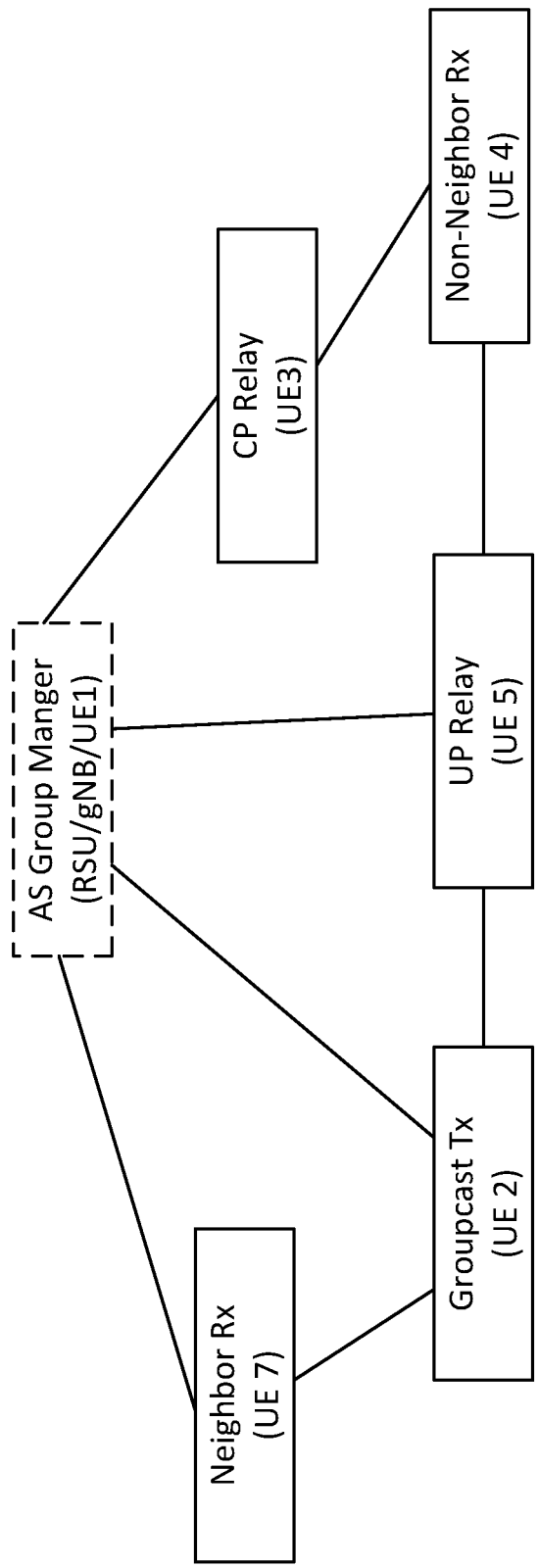
FIG. 3 shows an example topology for AS group management functions.

The SL AS group management function is disclosed for a UE to discover group members and organize them into AS layer sub-groups based on the AS layer group context information. The SL AS group management function can be realized in the centralized and distributed approach. There are five AS function entities as shown in FIG. 3. Note that FIG. 3 is a simplified example of an illustration that each Node only has a single function entity. A Node can have multiple function entities at the same time. For example, a Node can be a User Plane relay node and a Receiver of a groupcast message. In another example, a Node can be a groupcast transmitter and AS Group Managers at the same time.

AS Group Manager: The AS Group Manager only exists in the centralized approach. The AS Group Manager discovers AS group context information of UEs within a service range. The SL AS Group Manager can be a gNB, RSU, Scheduling UE, or group lead assigned by the upper layer, or formed via local nodes coordination. The AS Group Manager may know the AS layer ID associated with the ULG, and a UE may know the AS layer ID of the AS Group Manager from the upper layer or network configuration. In the centralized approach, based on the obtained AS group context information, SL AS Group Manager organizes an ULG into AS layer sub-groups, configures UE-to-UE relays for each UE in the group and sends the AS group management configuration to the UE via dedicated control messages. Note that, the AS Group Manager may be or may not belonging to the ULG group.

Groupcast Transmitter (Tx): Groupcast Tx receives a groupcast message from the upper layer and sends the message to all members in the ULG within a service range. The Groupcast Transmitter knows the AS layer ID associated with group members, which is generated based on the ULG ID. In the distributed example, Groupcast Tx discovers its ULG members and their AS group context information via exchange control messages. Based on the obtained group members AS group context information, the UE organizes the ULG into AS layer sub-groups, configures UE-to-UE relays via dedicated control message.

Groupcast Receiver (Rx): The Groupcast Rx receives the groupcast message sent by Groupcast Tx and delivers it to the upper layer. The Groupcast Receiver knows the AS ID of the ULG, which is generated based on the ULG ID. Based on the radio distance from the transmitter, the Groupcast Rx may be (i) multicast Neighbor Rx which is within the multicast distance from Groupcast Transmitter, (ii) unicast Neighbor Rx which is within the unicast distance from the Groupcast Transmitter, and/or (iii) Non-neighbor Rx which is out of the one-hop communication distance from the Groupcast Tx but can be reached via one or multiple User Plane Relays.

Control Plane (CP) Relay: Control Plane (CP) Relay relays AS group management control message between its neighbor Nodes.

User Plane (UP) Relay: User Plane (UP) Relay relays AS groupcast data message between its neighbor Nodes. The UP Relay can be a layer 2 or layer 3 relay.

Figure 4:
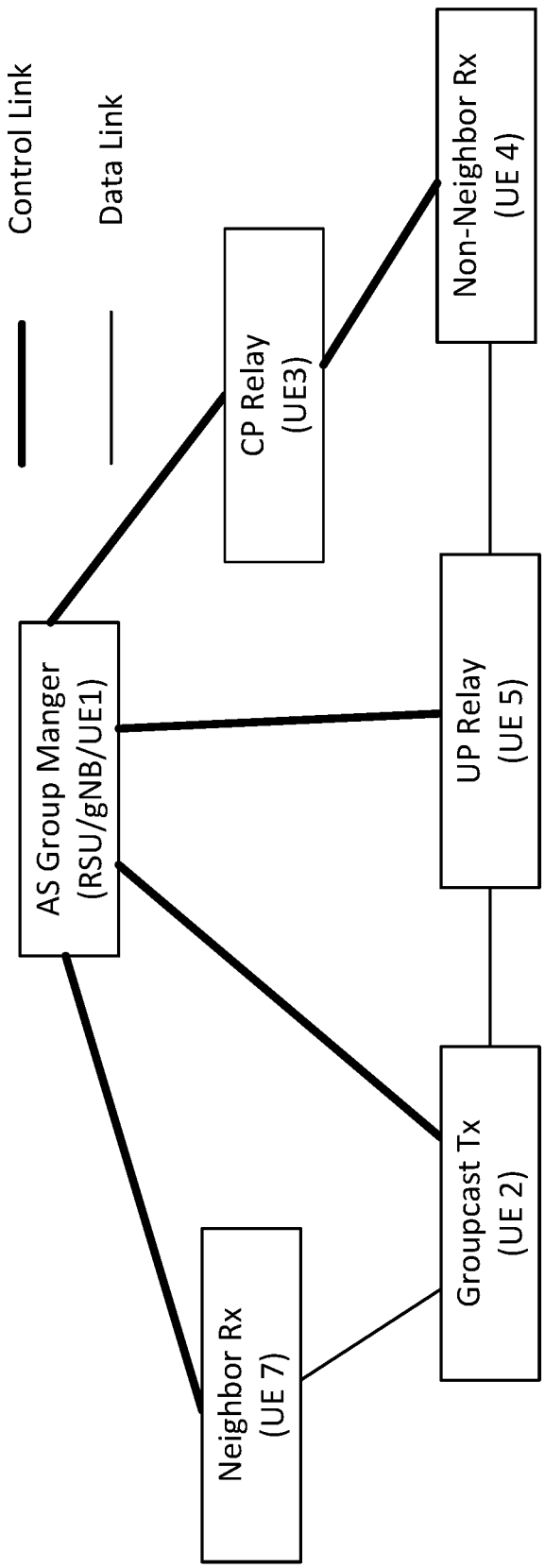
FIG. 4 shows an example centralized SL AS group management.
Figure 5:
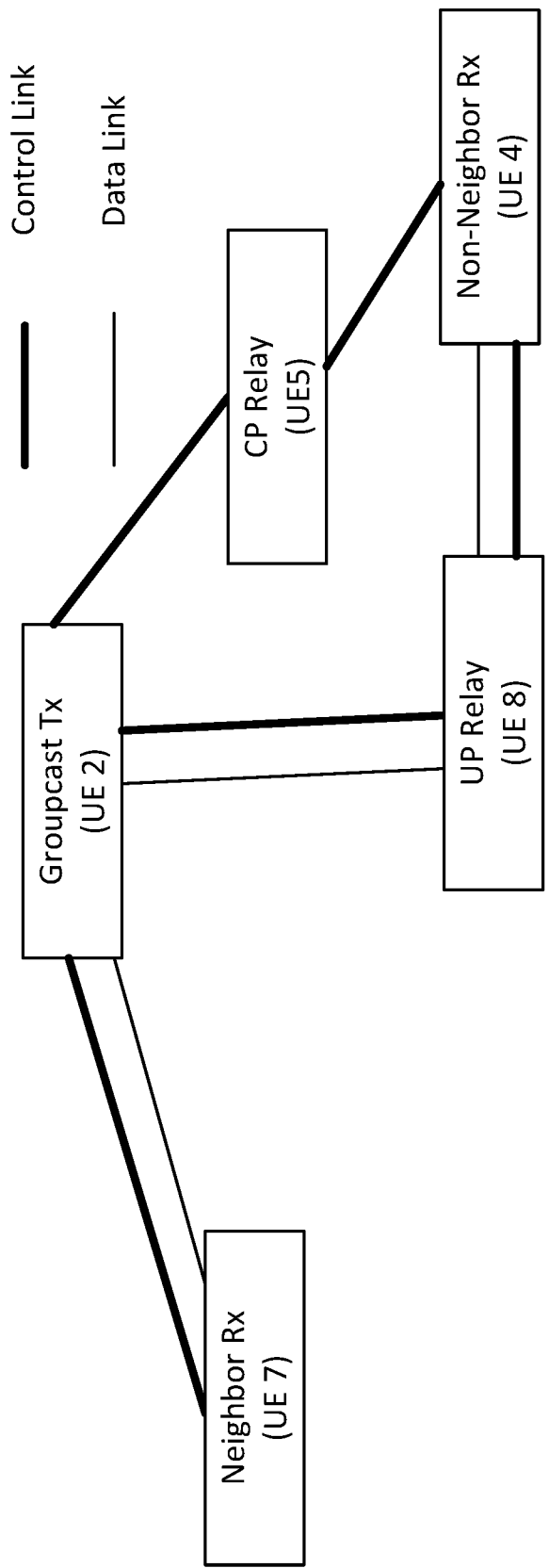
FIG. 5 shows an example distributed SL AS group management.

In the centralized approach as shown in FIG. 4, the SL AS Group Manager discovers group members and their AS context information via exchanging control messages. Based on the obtained group members AS group context information, SL AS Group Manager organizes the ULG into AS layer sub-groups, configures UE-to-UE relays for each UE in the ULG and sends the AS group management information to the UE via dedicated control messages.

Figure 6:
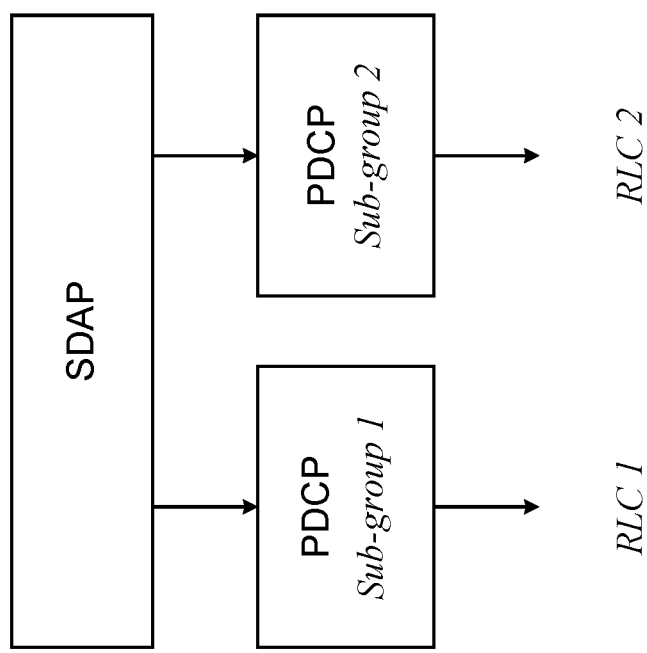
FIG. 6 shows a first example Layer 2 structure.

In the distributed approach as shown in FIG. 6, each UE discovers its group members and their AS context information via exchanging control messages. Based on the obtained group members AS context information, the UE organizes the ULG into AS layer sub-groups, configures UE-to-UE relays via dedicated control message.

SL Groupcast Bearer Management

Figure 7:
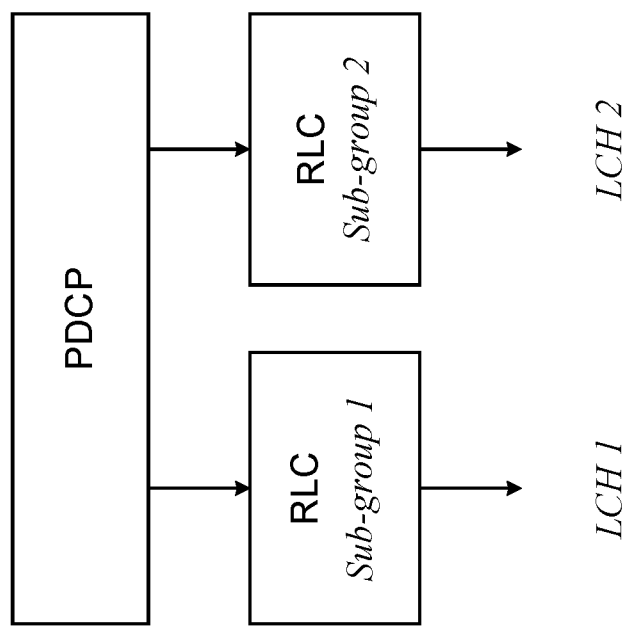
FIG. 7 shows a second example Layer 2 structure.
Figure 8:
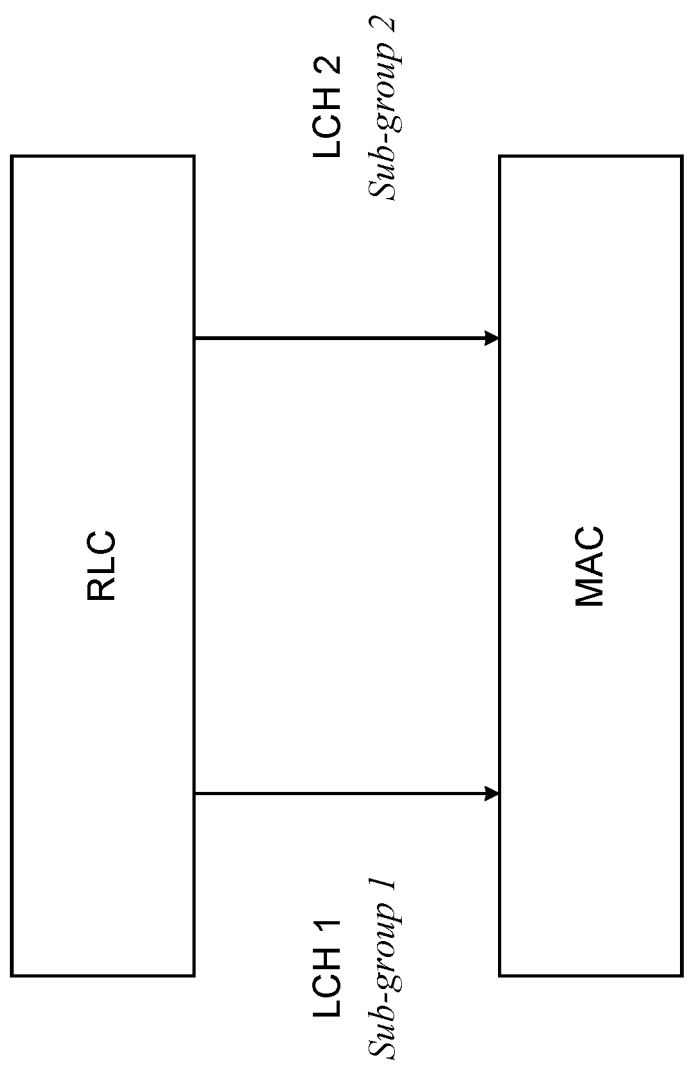
FIG. 8 shows a third example Layer 2 structure.
Figure 9:
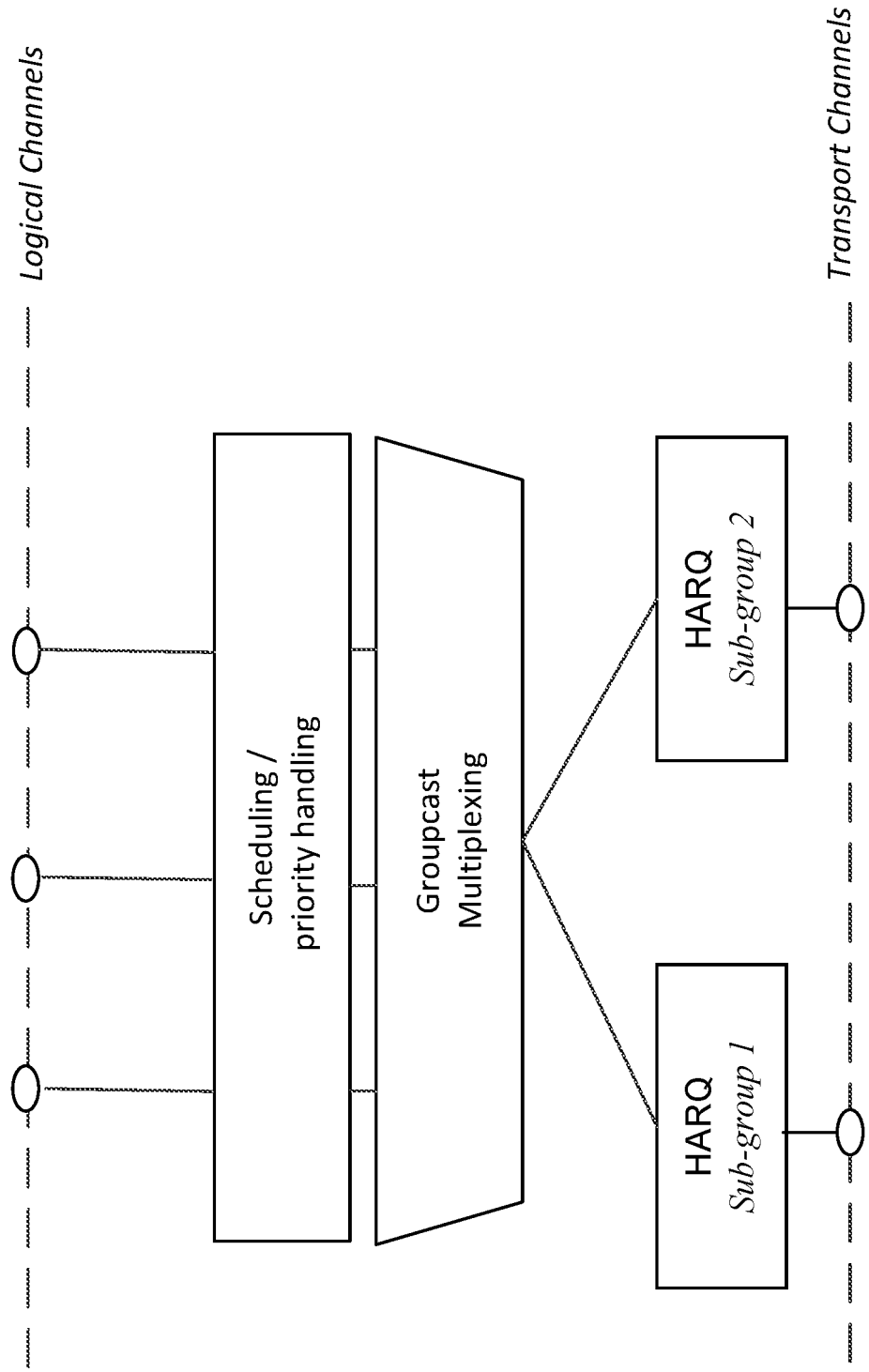
FIG. 9 shows a fourth example Layer 2 structure.
Figure 10:
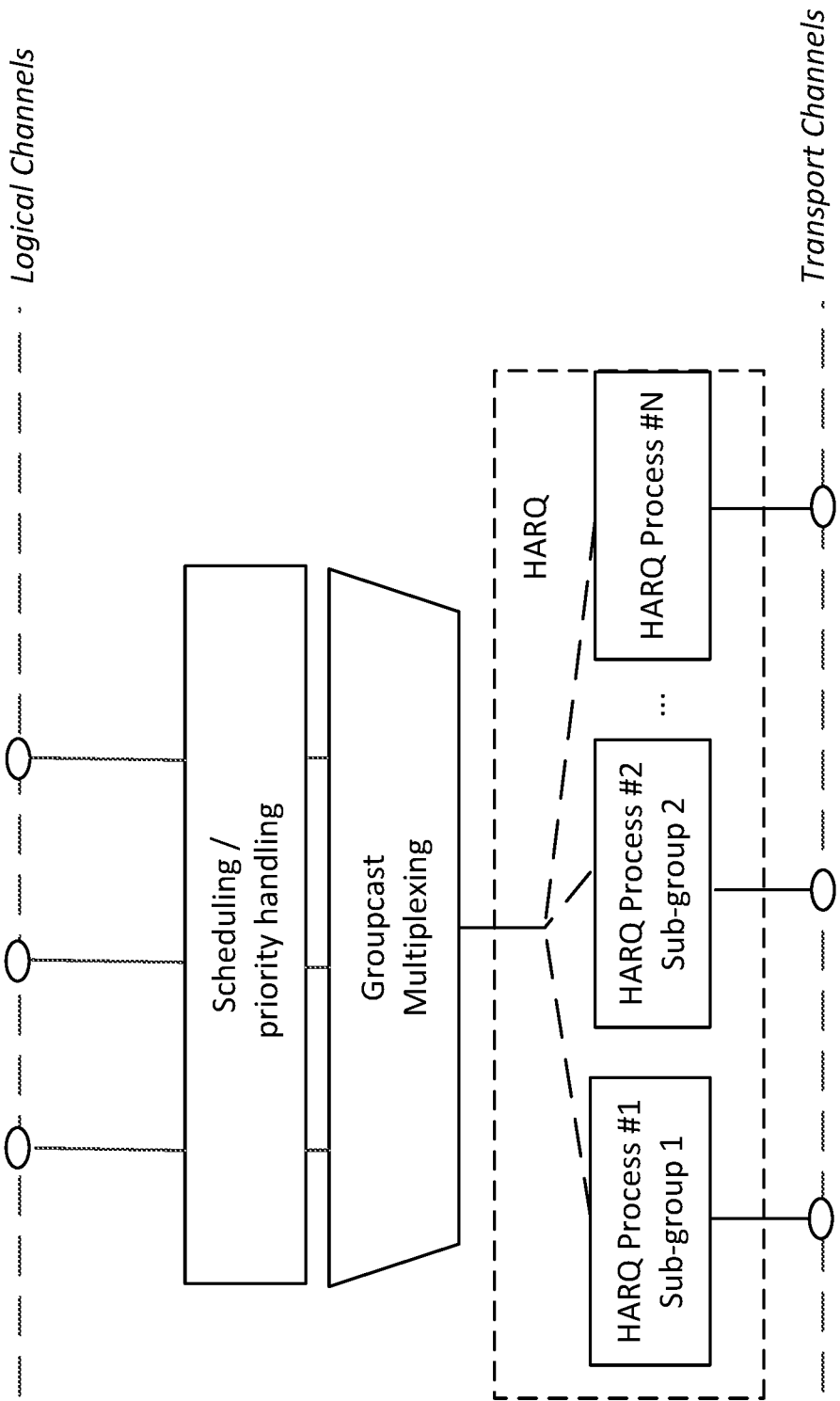
FIG. 10 shows a fifth example Layer 2 structure.

New Layer 2 structures are also disclosed to support multiple communication modes. In the first disclosed structure as shown in FIG. 6, SDAP entity divides the group into subgroups based on the QoS requirement of the groupcast message. Each subgroup has its own layer 2 destination ID and packets associated with different subgroups have separated radio bears. In the second disclosed structure as shown in FIG. 7, PDCP entity makes the duplications of PDCP PDU based on the number of subgroups and sends the PDU destined to different subgroups to different RLCs. In the third disclosed structure as shown in FIG. 8, the RLC entity makes the duplications of RLC PDU based on the number of subgroups and sends the PDU with different transmission mode to different Logical Channels. For example, if the initial transmission using multicast fails, the RLC entity can retransmits the packet using unicast mode to each group member that does not receive the message. In the fourth disclosed structure as shown in FIG. 9, MAC entity makes the duplications of MAC PDU based on the number of subgroups and sends the PDU with different transmission mode to different HARQ entities. In the fifth disclosed structure as shown in FIG. 10, MAC entity makes the duplications of MAC PDU based on the number of subgroups and sends the PDU with different transmission mode with different HARQ processes.

SL Groupcast Overview

Figure 21:
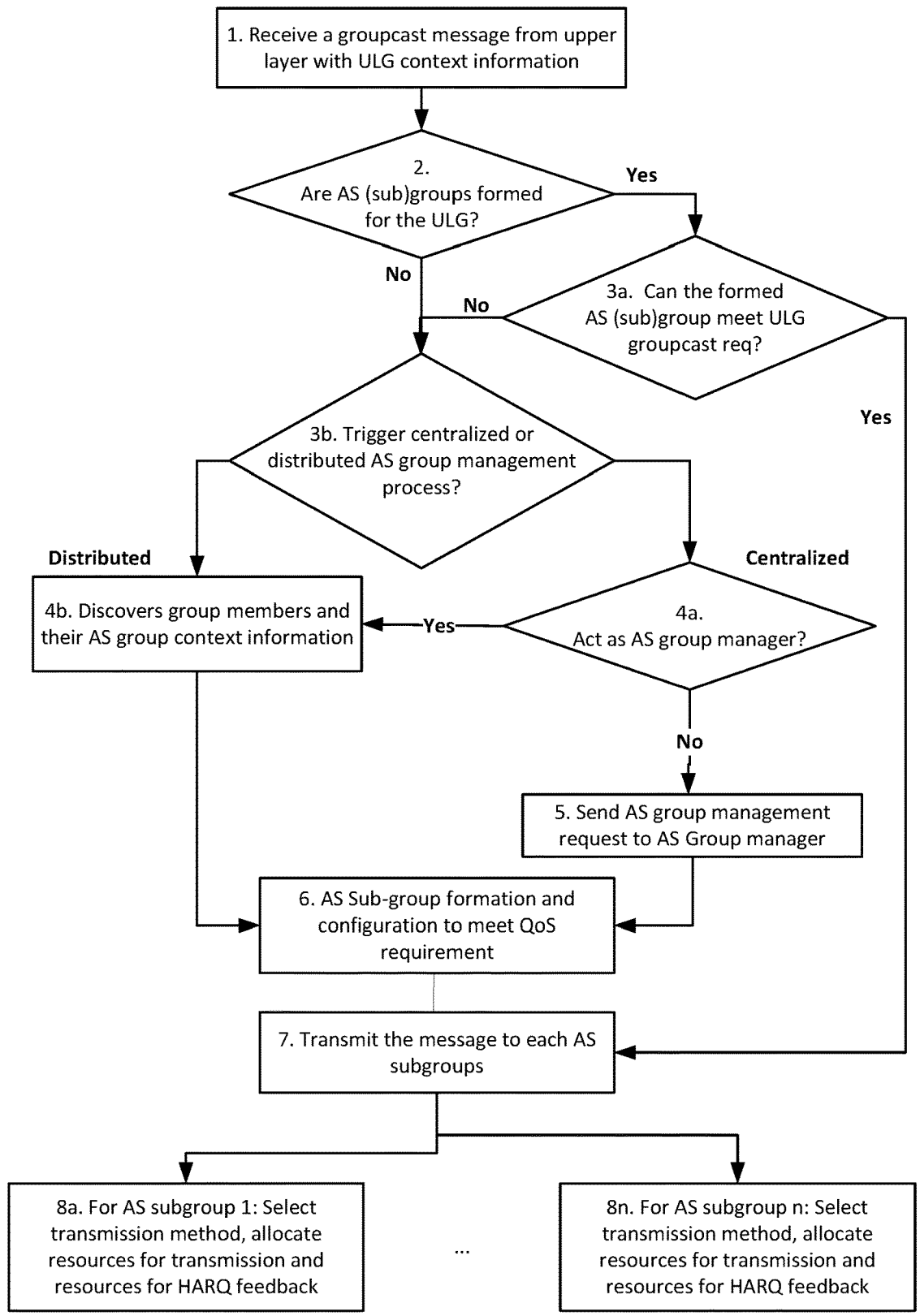
FIG. 21 shows an example overall process when a UE receives a groupcast message from its upper layer.
Figure 22:
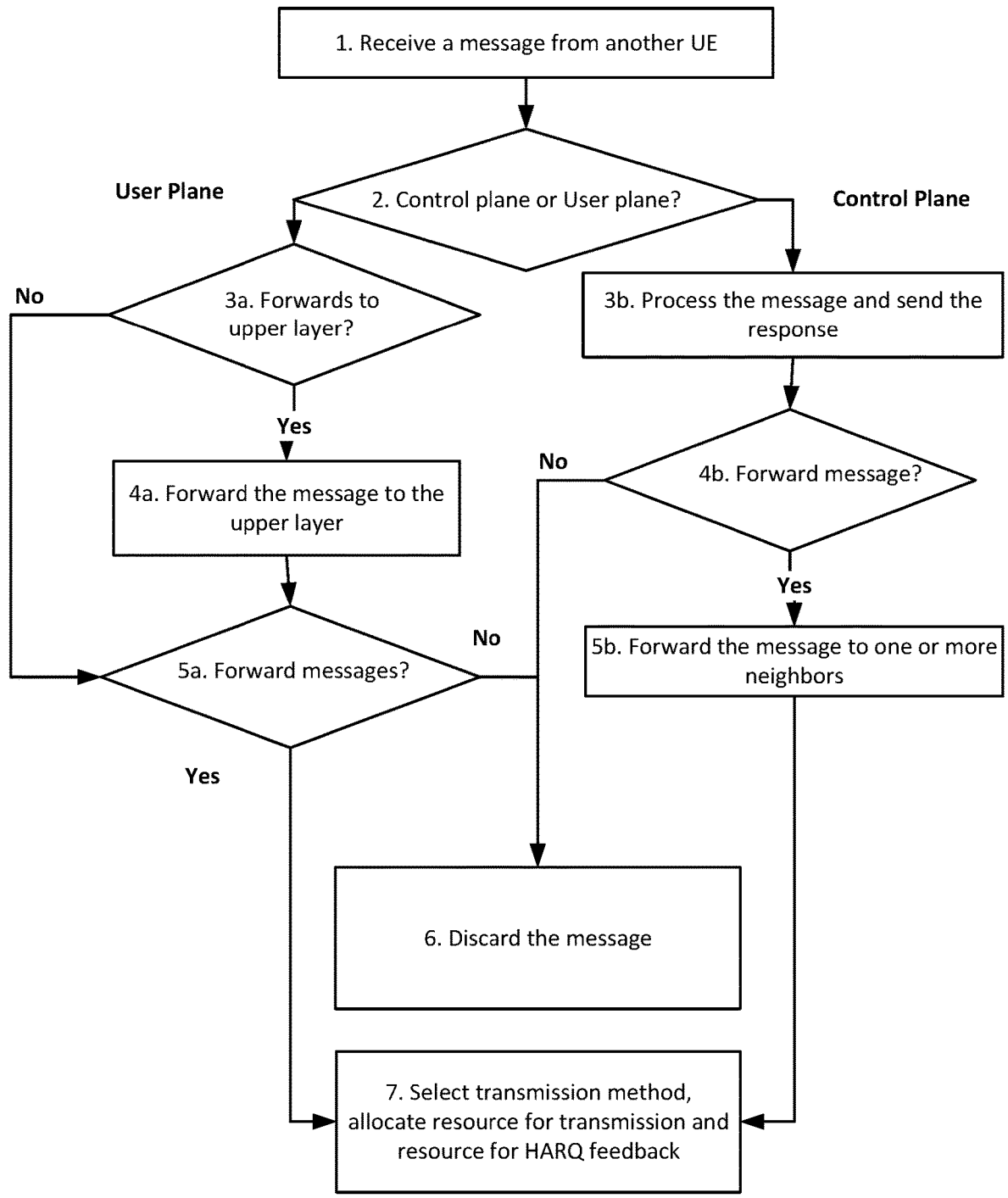
FIG. 22 shows an example overall process that a UE receives a groupcast message from another UE from its lower layer.

FIG. 21 shows an overall process that a UE receives a groupcast message from its upper layer which has diverse and stringent Sidelink QoS requirement, to all Upper Layer Group (ULG) members within a service range that may be bigger than one hop. FIG. 22 shows an overall process that a UE receives a groupcast message from another UE from its lower layer.

In FIG. 21, the UE that receives a groupcast message from an upper layer which has diverse and stringent Sidelink QoS requirement, to all Upper layer Group (ULG) members within a service range that may be bigger than one hop. The UE check whether an AS subgroup exists to fulfill the ULG groupcast requirement based on current AS group context information. If not, the message triggers a centralized or distributed SL AS group management procedure in the control plane. The procedure discovers ULG members and their AS group context information, then organizes the ULG into AS layer sub-groups, configures UE-to-UE relays. The UE establishes SL groupcast bearer for all subgroups and transmit groupcast data message to members in each subgroup. The UE selects transmission method, allocates resources for the transmission resources for HARQ feedback. The detail description of Figure I is as follows.

At step 1, a UE receives a groupcast message from its upper layer with ULG context information, e.g. ULG group size, group ID and service range.

At step 2, based on the ULG context information, e.g. ULG group size, group ID and service range, the UE checks whether an AS group which may contain several AS subgroups is formed for the ULG group. If an AS group which may contains several subgroups is formed, the UE goes to step 3a, otherwise, an AS group management process will be triggered to form a AS group which may contain several AS subgroups in step 3b.

At step 3a, the UE check whether the formed AS group can fulfill the QoS requirement and service range of the ULG groupcast message based on latest AS group context information in Table 1. If yes, the UE will transmit the message to each AS subgroups in step 7. Otherwise, the UE triggers an AS group management process to form a new AS group which may contain several AS subgroups in step 3b.

At step 3b, the UE initiates a centralized or distributed SL AS group management procedure in the control plane, which discovers ULG members and their AS group context information, then organizes the ULG into AS layer subgroups, configures UE-to-UE relays and establish groupcast bearer for each sub-groups. The UE goes to step 4a if it uses centralized AS group management procedure and goes to step 4b if it uses distributed AS group management procedure.

At step 4a, the UE checks whether it is configured or enabled to serve as a AS group manager. If so, it discovers group members and their AS group context information as in step 4b. Otherwise, the UE sends a AS group management request as described in Table 3 to the AS group manager to initiate the group management process.

At step 4b, the UE discovers group member and their AS group context information listed in Table 1. If the UE is a AS group manager in the centralized SL AS group management procedure, the UE discovers group members and their AS context information using passive and active discovery procedures. In the passive discovery procedure described in FIG. 11, UEs send AS group context information to the SL AS Group Manager. In the active discovery procedure described in FIG. 12, the SL AS Group Manager pulls AS group context information from UEs within a service range. In the distributed SL AS group management procedure, the UE discovers its group members and their AS context information via exchanging control messages using proactive and reactive discovery procedures. In the proactive discovery procedure described in FIG. 13, each UE periodically sends its AS group context information to all UEs within a service range. In the reactive discovery procedure described in FIG. 14, a UE sends discovery requests to and receives discovery response from all UEs within the service range to obtain AS group context information.

At step 5, the UE sends a AS group management request as described in Table 3 to the AS group manager to initiate the group management process.

At step 6, based on the obtained AS context information during AS group context discovery, in the centralized procedure, SL AS Group Manager organizes the ULG into AS layer sub-groups, configures UE-to-UE relays for each UE and sends the AS subgroup configuration information to the UE to establish groupcast bearer via dedicated control messages. In the distributed procedure, the UE organizes the ULG into AS layer sub-groups, configures UE-to-UE relays for each UE and sends the AS subgroup configuration information to the UE to establish groupcast bearer via dedicated control messages.

At step 7, after the AS group management procedure, the UE transmits groupcast data message to each subgroup members.

At step 8, for each AS subgroup, the UE selects transmission method and allocates resource for the transmission and resource for HARQ feedback.

FIG. 22 shows an overall process that a UE receives a groupcast message from another UE from its lower layer. The detail descriptions of FIG. 22 are described as follows.

At step 1, a UE receives a message from another UE from its lower layer.

At step 2, if the message is a groupcast data message, the UE further processes the message in step 3a. If the message is a groupcast control message, the UE further processes the message in step 3b.

At step 3a, based on its AS group configuration, if the UE is a member in the AS subgroup the groupcast message destinated to, the UE will forward the message to its upper layer as in step 4a. Otherwise, it decides whether to forward the message based on AS configuration.

At step 3b, the UE processes the groupcast control message and may send a response to the originator of request which contains its AS group context information.

At step 4a, the UE forwards the message to its upper layer.

At step 4b, the UE decides whether to forward the message to its neighbors based on AS configuration. If so, it forwards the message to one or more neighbors in step 5b, and discards the message otherwise in step 6.

At step 5a, the UE decides whether to forward the message based on AS subgroup configuration.

At step 6, the UE discards the message.

At step 7, the UE selects transmission method and allocates resource for the transmission and resources for the HARQ feedback.

SL AS Group Management

Centralized AS Group Management Procedures

In the centralized approach, the SL AS Group Manager discovers group members and their AS group context information via exchanging control messages. Based on the obtained group members AS group context information, SL AS Group Manager organizes the ULG into AS layer sub-groups, configures UE-to-UE relays for each UE in the group and send the AS group management configuration to the UE via dedicated control messages.

Centralized AS Group Discovery

In the centralized AS Group Management approach, an SL AS Group Manager discovers group members and their AS context information. Two centralized AS group discovery procedures, e.g., passive and active discovery procedures, are disclosed. In the passive discovery procedure, UEs send AS group context information to the SL AS Group Manager. In the active discovery procedure, the SL AS Group Manager pulls AS group context information from UEs within a service range. The AS group context information includes but is not limited to the fields show in Table 1. Note that a UE periodically exchanges AS layer messages with neighbors to obtain AS group context information of neighbors. The method about how a UE exchanges AS layer message with its neighbors is out of the scope of the disclosure.

TABLE 1

AS group context information

| Name | Description |
|---|---|
| AS group IDs | AS IDs associated with ULG the UE is belonging to. The AS ID is generated based on the ULG ID. A UE may be a group member of multiple ULGs. Therefore, the UE may have multiple AS IDs and each of them is associated to each ULG; |
| Relay Capability | The capability of the UE to support CP Relay or UP Replay for other UEs within the service range. |
| AS group context information of neighbors | This information may be obtained via periodically exchanging messages with Neighbors. The AS context information of neighbors includes but not limited to the following information<br>AS ID configured by the network or scheduling entity.<br>AS IDs associated with ULG the UE is belonging to.<br>Whether support CP Relay feature<br>Whether support UP Relay feature<br>AS link context information which includes the communication mode that can be used to communicate with the neighbor, e.g. multicast or unicast, the quality of the link. |

Passive Discovery Procedure

Figure 11:
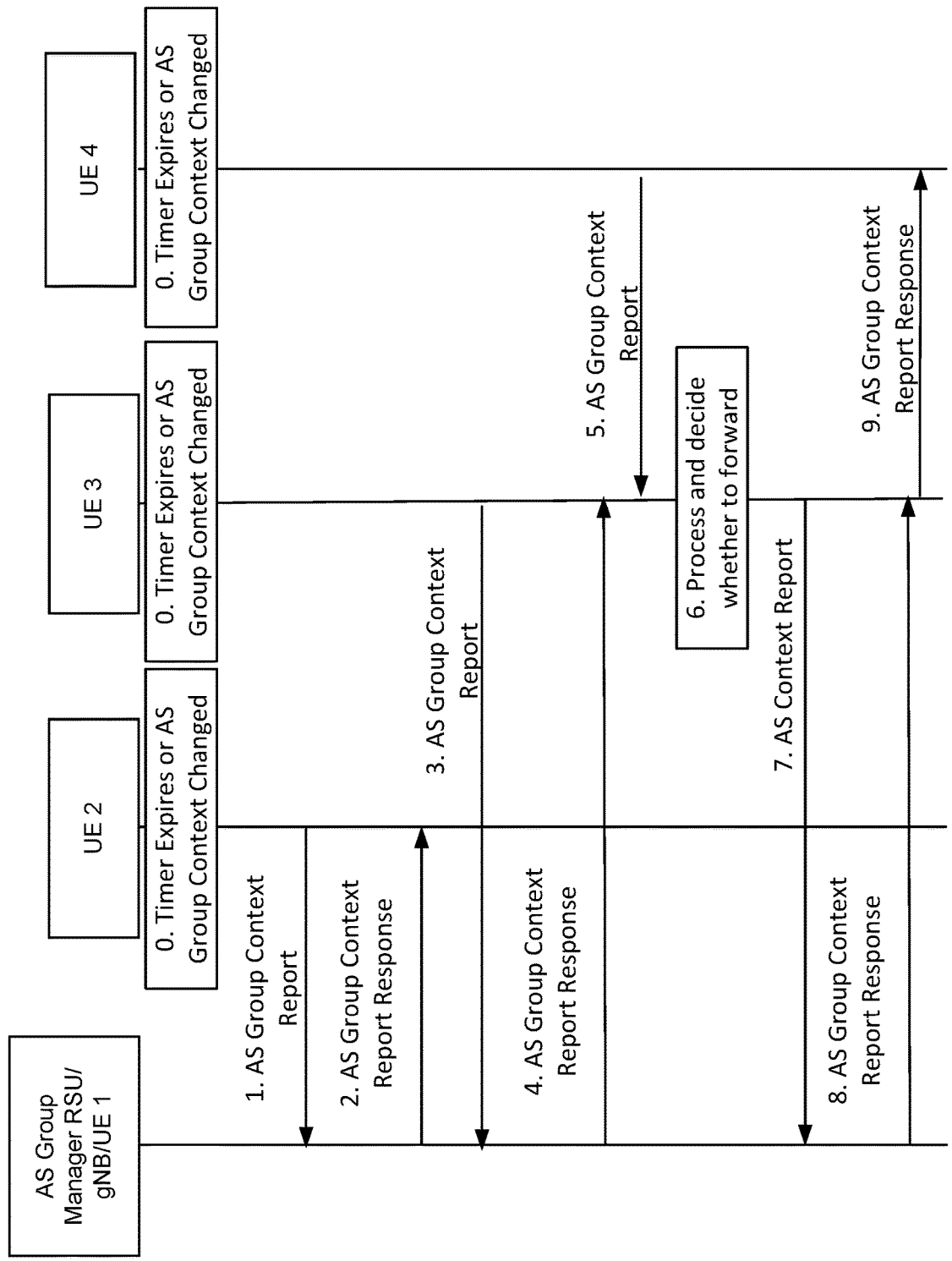
FIG. 11 is a call flow of an example method for passive discovery for centralized AS group management.

In the passive discovery procedure, a UE has been pre-configured or configured an AS ID assigned by the network and the AS ID of the Group Manager is known. The method about how a UE is pre-configured or configured is out of the scope of the disclosure. In the passive discovery procedure, a UE sends AS group context information to the SL AS Group Manager via AS Group Context Report messages as shown in FIG. 11. A UE may send AS Group Context Report message periodically based on a pre-configured or configured time interval, or when its AS group context information is changed as shown in step 0. In the message, the UE may include but not limited to information shown in Table 2.

TABLE 2

AS Group Context Report Message

| Fields name | Description |
|---|---|
| AS ID of the Reporting UE | The AS ID of the UE that reports the AS group context information. The AS ID is configured by the network or a scheduling entity. |
| AS ID of the Group Manager | The AS ID of the AS Group Manager which is configured by the network or scheduling entity |
| Sequence Number | The sequence number generated by the reporting UE to differentiate the AS Group Context Report message it sends. For example, the sequence number is increased by one for each new AS Group Context Report message generated. |

TABLE 2-continued

AS Group Context Report Message

| Fields name | Description |
| --- | --- |
| Position | The position of the UE, e.g. the GPS location |
| Maximum number of forwarding | The maximum number of times the AS Group Context Report can be forwarded. This value is decreased by one when the AS Group Context Report is forwarded by a Relay UE. The AS Group Context Report message which contains zero value of maximum forward time will be discarded. |
| Maximum forward physical range | The maximum distance the AS Group Context Report can be forwarded. A Relay UE will not forward a AS Group Context Report message originated from a reporting UE, if the distance to the reporting UE is bigger than the maximum forward range. |
| AS group context information | As described in Table 1 |
| AS IDs of Relay UEs traversed | The AS ID of each Relay UE the AS Group Context Report message has traversed. Each Relay UE will append its AS ID in this field if it forwards the AS Group Context Report message. |
| Capability of Relay UE traversed | The capability of the Relay UE, e.g. whether support CP Relay or UP Replay for the reporting UE. Each Relay UE will append its capability in this field when it forwards the AS Group Context Report message. |

If a UE is one hop away from the AS Group Manager, e.g. UE2 and UE3 as shown in FIG. 1, the UE can send a AS Group Context Report message directly to AS Group Management as shown in step 1 and 3 in FIG. 11. After receiving the message, the AS Group Manager sends a AS Group Context Report Response message to the UE to confirm the message.

If a UE is multiple hops away from the AS Group Manager, e.g. UE 4 as shown in FIG. 1. The UE 4 sends the AS Context Report towards the AS Group Manager via one or multiple neighbors. In one example, if UE 4 knows the UE that can forward AS Context Report message to the AS Group Manager, UE 4 will unicast the message to the UE, e.g. UE 3 in FIG. 1.

In another example, if UE 4 does not know which UE can forward AS Context Report message to the AS Group Manager or does not receive a AS Group Context Report Response message from the AS Group Manager in the first example, UE 4 will broadcast the message to all its UE neighbors, e.g. UE 3, UE 5 and UE 8. When a UE, e.g. UE 3 in FIG. 4, receives the message, it processes the message and decides whether to forward the message to the AS Group Manager as shown in step 4 in FIG. 11 The UE may decide whether to forward the message based on the following criteria:

Forward if the Reporting UE is in the same ULG;
Forward if it has Control Plane (CP) Relay or User Plane (UP) Relay function;
Forward if the maximum number of forwarding is bigger than zero;
Forward if the distance from the Reporting UE smaller than the maximum forward range;
Forward if it has never received the message with same sequence number originated from the same Reporting UE.

If the UE decides to forward the message, it will decrease the value of maximum number of forwarding by one in the message and insert its AS ID configured by the network and capability information append in AS Group Context Report message, then sends the message towards AS Group Manager following the same procedure described above.

The AS Group Manager may receive multiple AS Group Context Report messages from the reporting UE via different paths. The AS Group Manager may choose a path to send the AS Group Context Report Response. The response may contain the AS ID of each relay UE on the path, and these relay UEs forward the response to the reporting UE. After receiving the response, the d Reporting UE knows the Neighbor UE that can forward AS Context Report message to the AS Group Manager for future AS Group Context Report message.

Active Discovery Procedure

Figure 12:
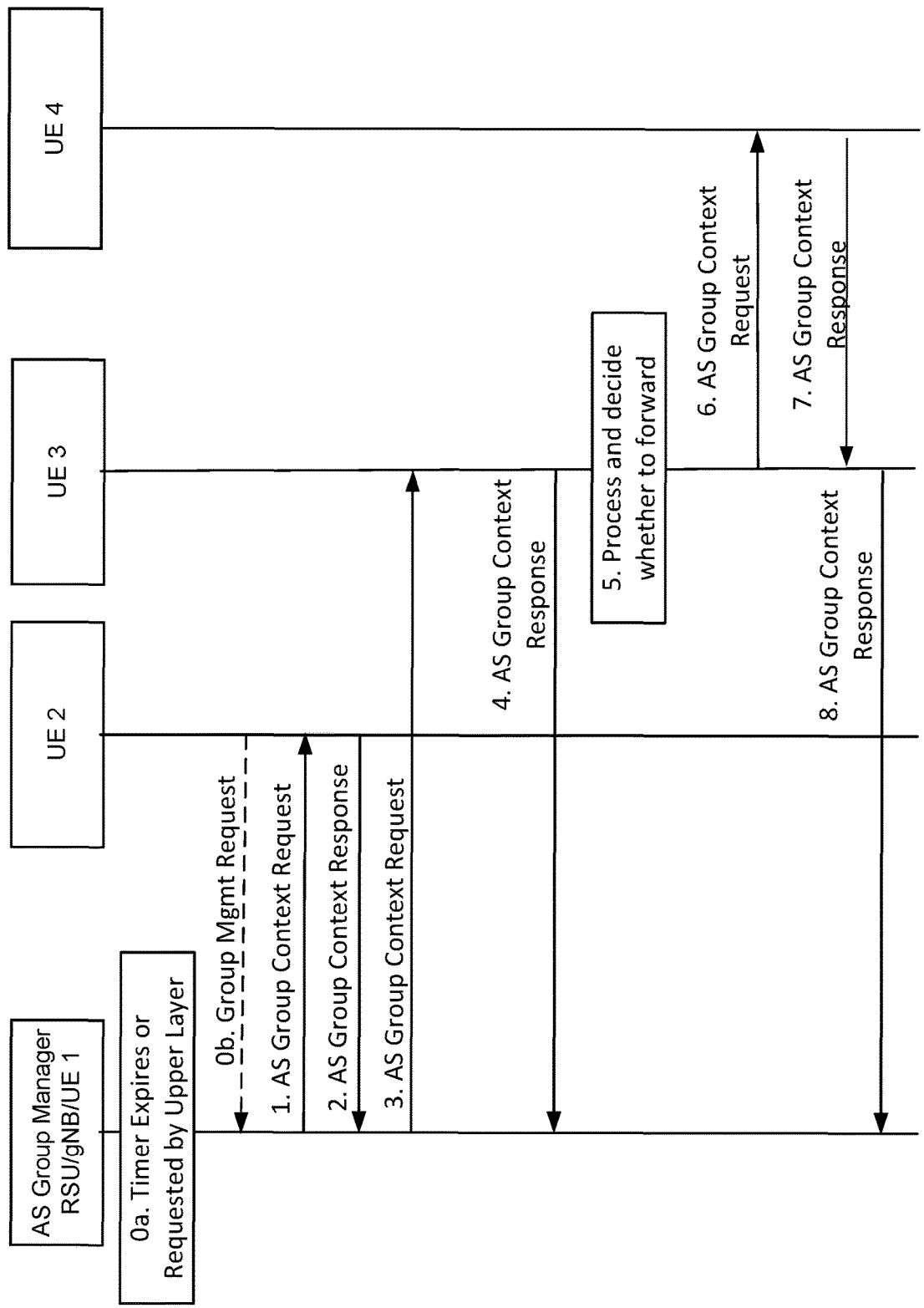
FIG. 12 is a call flow of an example method for active discovery for Centralized AS group management.

In the active discovery procedure, a UE has been pre-configured or configured a AS ID assigned by the network. SL AS Group Manager retrieves AS group context information of all UEs within a service range. In the active discovery procedure, SL AS Group Manager sends an AS Group Context Request message to all UEs within a service range as shown in FIG. 12 The SL AS Group Manager may send AS Group Context Request message periodically, when it receives a Group Management Request from upper layer or a AS Group Management Request from another node in the network as shown in step 0 in FIG. 12. The AS Group Management Request message may include but is not limited to the information shown in Table 3. The AS Group Context Request message may include but not limited to information shown in Table 4.

TABLE 3

AS Group Management Request Message

| Fields name | Description |
| --- | --- |
| AS group IDs | AS IDs associated with ULG that the node requests the AS Group Manager to manage. |
| Position | The position of the node that sends the request, e.g. the GPS location. |

TABLE 3-continued

AS Group Management Request Message

| Fields name | Description |
| --- | --- |
| Service range | The range within which the node requests the AS Group Manager to manage the group. |

TABLE 4

AS Group Context Request Message

| Fields name | Description |
| --- | --- |
| AS ID of the AS Group Manager | The AS ID of the AS Group Manager that sends the request. |
| AS ID of the Reporting UEs | The AS ID of the UEs that report the AS group context information via a response after receiving the request. If this field is empty, all UEs that receive the request with a different sequence number should send a response to report their AS group context information. |
| Sequence Number | The sequence Number generated by the AS Group Manager to differentiate the AS Group Context Request message it sends. For example, the sequence number is increased by one for each new AS Group Context Request message generated. |
| Position | The position of the AS Group Manager or the node that sends the group management request, e.g. the GPS location |
| Maximum number of forwarding | The maximum number of times the AS Group Context Request can be forwarded. This value is decreased by one when the AS Group Context Request is forwarded by a Relay UE. The AS Group Context Request message which contains zero value of maximum forward time will be discarded. |
| Maximum forward physical range | The maximum distance the AS Group Context Request can be forwarded. A UE will not forward a AS Group Context Request message originated from the AS Group Manager, if the distance to the AS Group Manager is bigger than the maximum forward range. |
| AS group IDs | AS IDs associated with ULGs that the AS Group Manager request to discover. If this field is not empty, only the UE that belongs to one of the ULGs reports the AS group context information. |
| AS IDs of Relay UEs traversed | The AS ID of each Relay UE the AS Group Context Request message has traversed. Each Relay UE will append its AS ID in this field if it forwards the AS Group Context Request message. |

If the AS Group Manager knows a UE within a service range and the Relay UEs that can forward AS Context Request message to the UE within a service range. The AS Group Manager will unicast the message to the UE via relay UEs. For example, the AS Group Manager sends a AS Group Context Request to UE3, UE 3 will forward the request UE 4. When UE 4 receives the request, it reports its AS group context information to the AS Group Manager via the AS Group Context Response message. The AS Group Context Response message includes but not limited as shown in Table 4. The UE 3 also forwards the AS Group Context Response back to AS Group Manager.

TABLE 5

AS Group Context Response Message

| Fields name | Description |
| --- | --- |
| AS ID of the AS Group Manager | The AS layer ID of the AS Group Manager that sends the request. |
| AS ID of the Reporting UE | The AS ID of the UE that reports the AS group context information via a response after receiving the request. |
| Sequence Number | The Sequence Number received in the request. |
| AS group context information | As described in Table 1. |
| AS IDs of Relay UEs traversed | The AS ID of each Relay UE the AS Group Context Request message has traversed. The Relay UE may use this information to forward the response back to the AS Group Manager. |

If the AS Group Manager does not know all UEs within a service range nor the Relay UEs that can forward AS Context Request message to each UE within a service range. AS Group Manager broadcasts the AS Group Context Request message to all UEs within a service range. The AS Group Manager first broadcasts a AS Group Context Request to its neighbors, e.g. UE 2, UE 3, UE 5, and UE 7 in FIG. 1. When a UE, e.g. UE 3, receives the message, it processes the message and decides whether to forward the message to its neighbors as shown in step 5 in FIG. 12. The UE may decide whether to forward the message based on the following criteria:

- Forward if the UE belongs to the same ULG as indicated in AS group IDs field in the request;
- Forward if it has Control Plane (CP) Relay or User Plane (UP) Relay function;
- Forward if the maximum number of forwarding is bigger than zero;
- Forward if the distance from the AS Group Manager is smaller than the maximum forward range;
- Forward if it has never received the message with same sequence number originated from the AS Group Manager.

If the UE decides to forward the message, it will decrease the value of maximum number of forwarding by one in the message and insert its AS ID configured by the network append in AS Group Context Request message, then broadcasts the message to its neighbors following the same procedure described above.

A UE may receive multiple AS Group Context Request messages from the AS Group Manager via different paths. The UE may choose a path to send the AS Group Context Report Response. The response may contain the AS ID of each relay UE on the path, and these relay UEs forward the response to AS Group Manager.

Centralized AS Sub-group formation and Configuration

Based on the obtained AS context information during AS group context discovery, SL AS Group Manager organizes the ULG into AS layer sub-groups, configures UE-to-UE relays for each UE, and send the AS subgroup configuration information to the UE via dedicated control messages. The procedure can be triggered if the AS Group Context is changed after a group context discovery procedure. The procedure can also be triggered if the AS Group Manager receives a request from upper layer or an AS group management request from another node in the network as shown in step 0 in FIG. 13.

TABLE 6

AS Group Management Information for a ULG Member

| Fields name | Description |
| --- | --- |
| AS ID of ULG member | The AS ID of the UEs that are in the ULG |
| Path to ULG member | The path from AS Group Manager to the UE |
| Management Information of AS subgroup Group | The subgroup information for each subgroup associated with the ULG as described in Table 7 |

TABLE 7

AS Subgroup Management Information for a ULG Member

| Fields name | Description |
| --- | --- |
| AS ID of Subgroup | The AS ID of subgroup. |
| Communication Mode | The communication mode to transmit a message to the group, e.g. multicast or unicast. |
| AS ID of Subgroup member 1 | AS ID of the UEs that are in the subgroup. |
| Path to Subgroup member 1 | The path from the UE to the subgroup member. |
| AS ID of Subgroup member n | AS ID of the UEs that are in the subgroup. |
| Path to Subgroup member n | The path from the UE to the subgroup member. |

Figure 13:
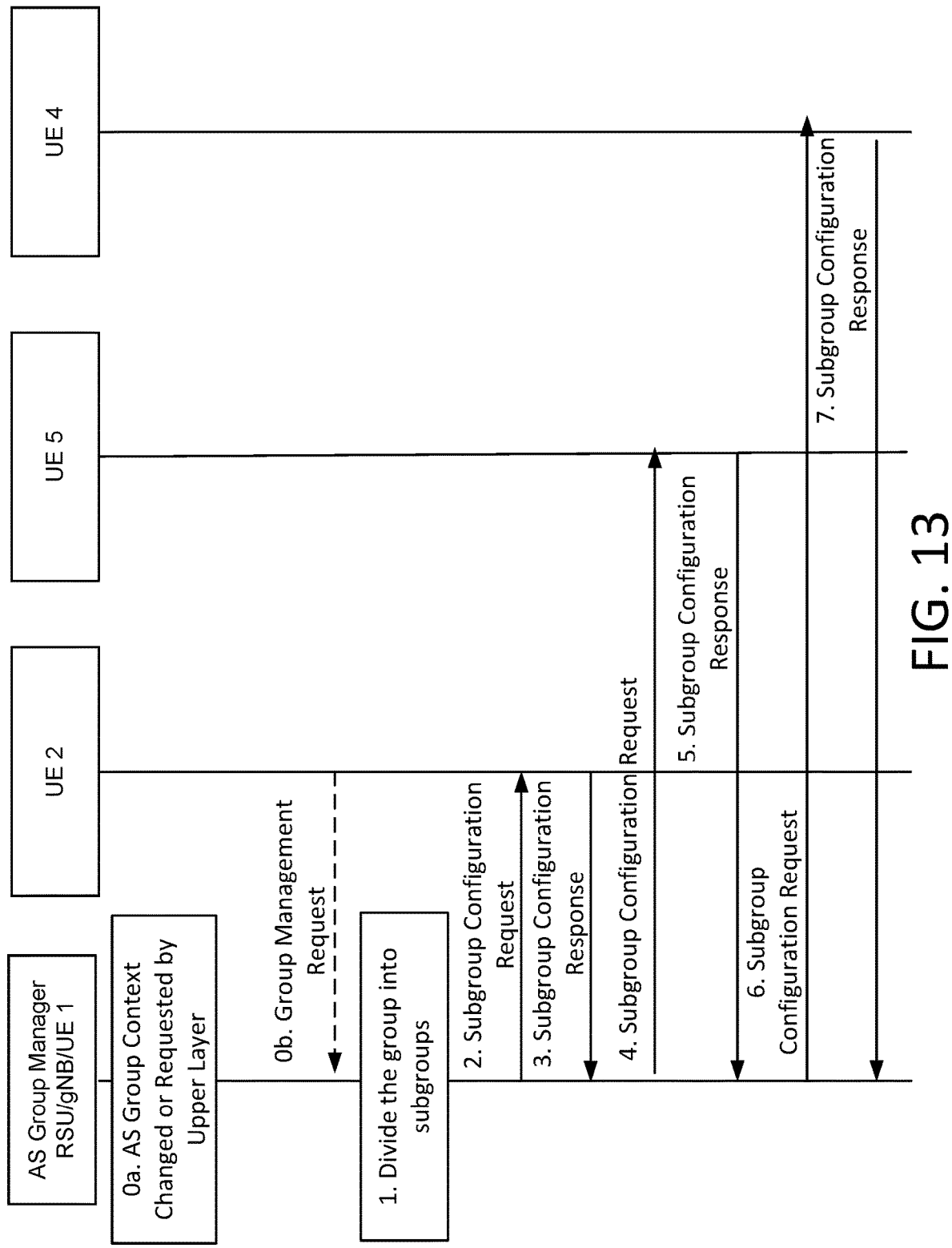
FIG. 13 is a call flow of an example method for sub-group formation and configuration for centralized AS group management.

For each ULG, the AS Group Manager organizes the ULG to AS subgroup for each UE in the ULG as shown at step 1 in FIG. 13. The algorithm about how to divide a ULG into subgroups is out of scope of the disclosure. The AS group management information is stored at the AS Group Manager as shown in Table 6. Using the topology in FIG. 1 as an example, ULG 1 contains UE 2, 4, 6, 7 and 8. The AS Group Manager creates group management information for each UE in the ULG. For example, for UE 2, the AS Group Manager organizes the ULG 1 into three subgroups. Subgroup 1 contains UE 6 and 7 that can be reached via a multicast transmission. Subgroup 2 contains UE 8 that can be reached via a unicast transmission. Subgroup 3 contains UE 4 that can be reached via a unicast transmission to UE 5, which forwards the message to UE 4. The AS ID of subgroup can be generated based on the AS ID of the ULG 1 and the AS ID of UE 2, which is unique within the proximity. Based on the AS Group Management information, the AS Group Manager configures each UE in the ULG via subgroup configuration request. In FIG. 13, steps 2-7 show an example that the AS Group Manager configures UE 2 and its Subgroup 3 which contains UE 4.

At step 2, the AS Group Manager sends a subgroup configuration request to UE 2. The subgroup configuration request contains AS ID of the ULG and the information for each AS subgroup as described in Table 8. After receiving the message, UE 2 knows the ULG 1 contains UE 2, 4, 6, 7, and 8 and three AS subgroups. Subgroup 1 contains UE 6 and 7 that can be reached via a multicast transmission. Subgroup 2 contains UE 8 that can be reached via a unicast transmission. Subgroup 3 contains UE 4 that can be reached via a unicast transmission to UE 5, which forwards the message to UE 4.

At step 3, UE 2 sends a subgroup configure response to confirm the subgroup configurations.

At step 4, the AS Group Manager sends a subgroup configuration request to UE 5. The subgroup configuration request contains AS subgroup information of subgroup 3 as described in Table 8. After receiving the request, UE 5 knows if it receives a message originated from UE 2 for AS subgroup 3, it will forward message to UE 4.

At step 5, UE 5 sends a subgroup configure response to confirm the subgroup configurations.

At step 6, the AS Group Manager sends a subgroup configuration request to UE 4. Since the UE 4 is more than one hop away from the AS Group Manager, the message can be relayed by UE 3 or UE 5. The subgroup configuration request contains AS subgroup information of subgroup 3 as described in Table 8. After receiving the request, UE 4 knows it may receive a groupcast message originated from UE 2 for AS Subgroup 3.

At step 7, UE 4 sends a subgroup configure response to confirm the subgroup configurations. Since UE 4 is more than one hop away from the AS Group Manager, the message can be relayed by UE 3 or UE 5.

TABLE 8

| Fields name | Description |
| --- | --- |
| | AS Subgroup Configuration Request |
| AS ID of Groupcast Originator | AS ID of the UE that generates groupcast message. |
| AS ID of ULG | The AS ID of the ULG. |
| AS ID of Subgroup | The AS ID of subgroup. |
| Relay Function | Whether the UE is select as a relay UE. |
| Communication Mode | The communication mode to relay the message. |
| AS ID of Subgroup member 1 | AS ID of the UE that is $1^{st}$ subgroup member in the subgroup. |
| AS ID of Relay UEs for Subgroup member 1 | AS ID of the Relay UEs that forward the message to the subgroup member 1. |
| AS ID of Subgroup member n | AS ID of the UE that is $n^{th}$ subgroup member in the subgroup. |
| AS ID of Relays UE for Subgroup member n | AS ID of the Relay UEs that forward the message to the subgroup member N. |

Distributed AS Group Management Procedures

In the distributed approach, each UE discovers group members and obtains their AS group context information. Based on the obtained AS group context information of group members, the UE organizes the ULG into AS layer subgroups and configures UE-to-UE relays via dedicated message.

Distributed AS Group Discovery Procedures

In the distributed AS group management approach, each UE discovers group members and obtains their AS context information. Two distributed AS group discovery procedures, e.g., proactive and reactive discovery procedures are disclosed. In the proactive discovery procedure, each UE periodically sends its AS group context information to all UE within a service range. In the reactive discovery procedure, a UE sends discovery requests to and receives discovery response from all UEs within the service range to obtain AS group context information. The AS group context information includes but not limited filed show in Table 1. Note that a UE periodically exchanges AS layer messages with neighbors to obtain AS context information of neighbors.

Proactive Discovery Procedure

Figure 14:
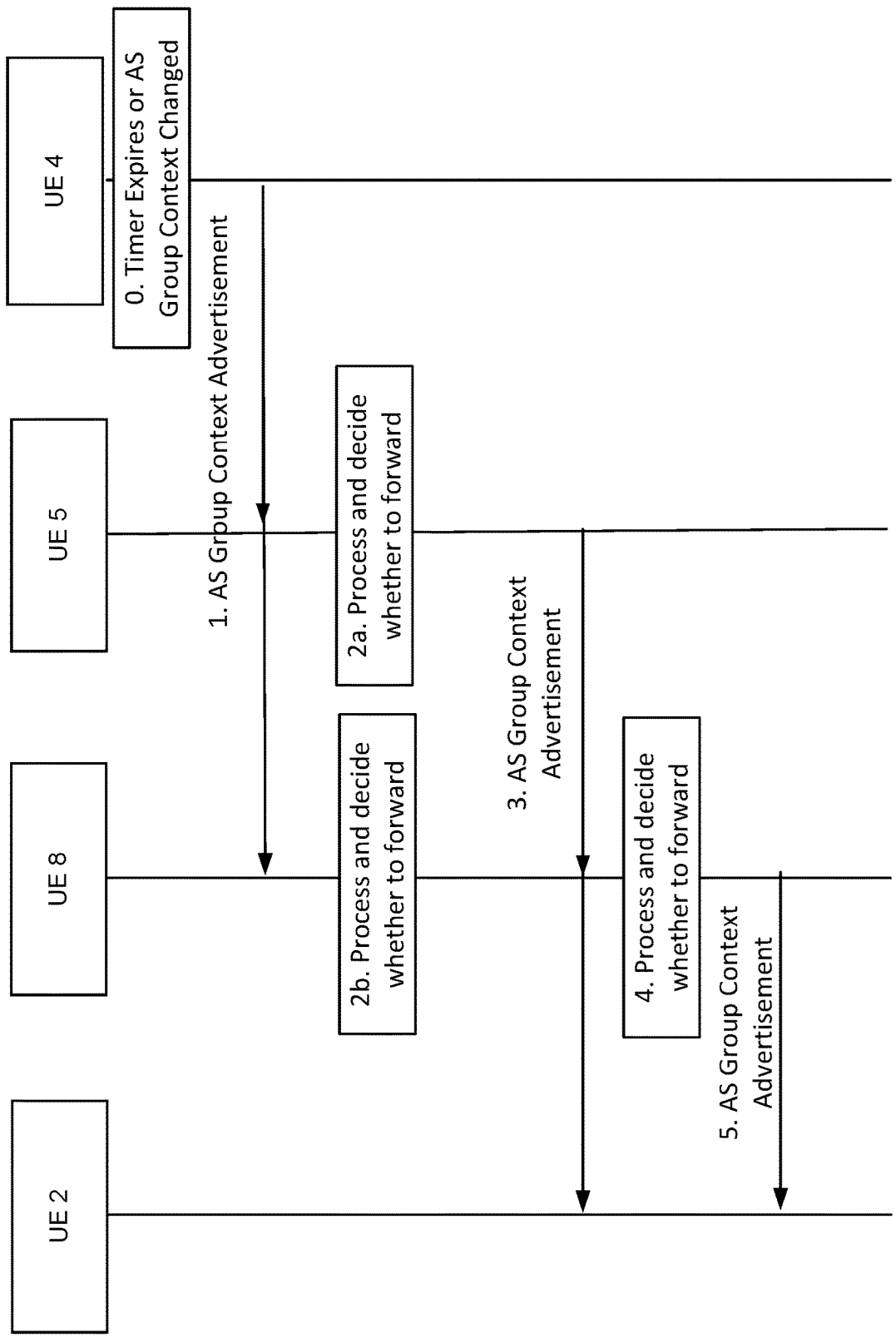
FIG. 14 is a call flow of an example method for a proactive discovery procedure for distributed AS group management.

In the proactive discovery procedure, a UE has been pre-configured or configured a AS ID assigned by the network. The method about how a UE is pre-configured or configured is out of the scope of the disclosure. In the proactive discovery procedure, a UE sends AS group context information to all UEs within a service range via AS Group Context Advertisement messages as shown in FIG. 14. A UE may send AS Group Context Advertisement message periodically, or when its AS group context information changed as shown in step 0. To illustrate the disclosed procedure, UE 4 in FIG. 1 is used as an example.

TABLE 9

| AS Group Context Advertisement Message | |
| --- | --- |
| Fields name | Description |
| AS ID of the Advertising UE | The AS ID of the UE that advertises the AS group context information, which is configured by the network or scheduling entity. |
| Sequence Number | The sequence number generated by the reporting UE to differentiate the AS Group Advertisement Report message it sends. For example, the sequence number is increased by one for each new AS Group Context Advertisement message generated. |
| Position | The position of the UE, e.g. the GPS location. |
| Maximum number of forwarding | The maximum number of times the AS Group Context Advertisement can be forwarded. This value is decreased by one when the AS Group Context Advertisement is forwarded by a Relay UE. The AS Group Context Advertisement message which contains zero value of maximum forward time will be discarded. |
| Maximum forward physical range | The maximum distance the AS Group Context Advertisement can be forwarded. A UE will not forward a AS Group Context Advertisement message originated from a reporting UE, if the distance to the reporting UE is bigger than the maximum forward range. |
| AS group context information | As described in Table 1. |
| AS IDs of Relay UEs traversed | The AS ID of each Relay UE the AS Group Context Advertisement message has traversed. Each Relay UE will append its AS ID in this field if it forwards the AS Group Context Advertisement message. |
| Capability of Relay UE traversed | The capability of the Relay UE, e.g. whether support CP Relay or UP Replay for the reporting UE. Each Relay UE will append its capability in this field when it forwards the AS Group Context Advertisement message. |

At step 1, the UE 4 sends the AS Context Advertisement message to all its neighbors, e.g. UE 3, UE 5 and UE 8. In the message, the UE may include but not limited to information shown in Table 9.

At step 2a, when a UE, e.g. UE 5, receives the message, it processes the message and decides whether to forward the message to its neighbors. If UE 5 has never received the message with same sequence number originated from the same UE, UE 5 will store or update the AS group context information associated with UE 4. Otherwise, UE 5 will discard the message. UE 5 may decide whether to forward the message to its neighbors based on the following criteria:

Forward if the Advertising UE is in the same ULG;
Forward if it has Control Plane (CP) Relay or User Plane (UP) Relay function;
Forward if the maximum number of forwarding is bigger than zero;
Forward if the distance from the Advertising UE smaller than the maximum forward range;
Forward if it has never received the message with same sequence number advertised from the same UE.

If the UE decides to forward the message, it decreases the value of maximum number of forwarding by one in the message and may insert its AS ID configured by the network and capability information appended in AS Group Context Advertisement message, then sends the message to all its neighbors except the transmitter of the message as shown in step 3.

At step 2b, UE 8 follows the same procedure as UE 5 in step 2a.

At step 3, UE 5 then sends the AS Group Context Advertisement message to all its neighbors except the transmitter of the message.

At step 4, UE 8 follows the same procedure as UE 5 in step 2a. Since UE 8 already receives a AS Group Context Advertisement message from UE 4 with the same sequence number, UE 8 will discard the message.

At step 5, UE 8 then sends the AS Group Context Advertisement message to all its neighbors except the transmitters of the message.

Reactive Discovery Procedure

Figure 15:
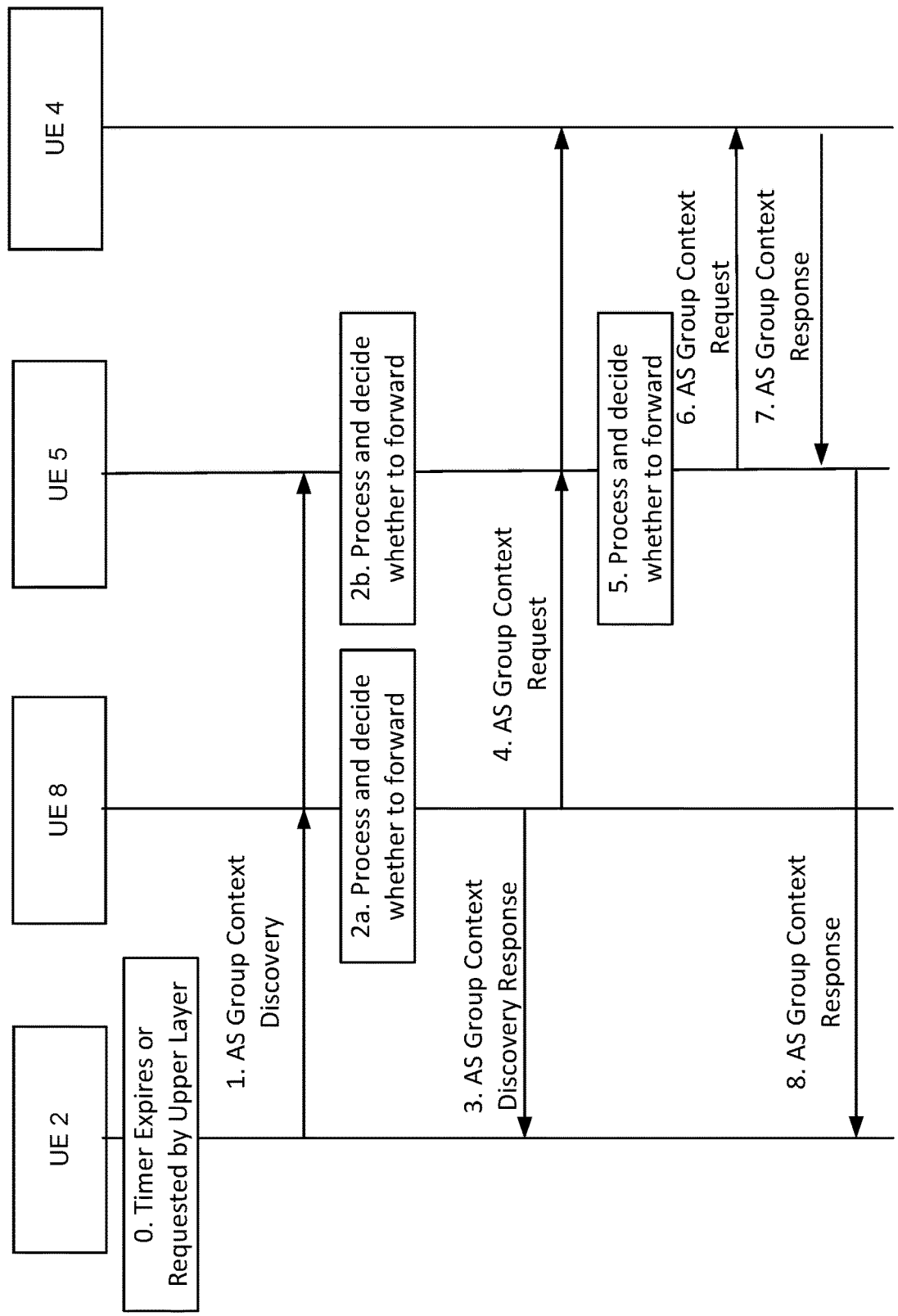
FIG. 15 is a call flow of an example method for a reactive discovery procedure for distributed AS group management.

In the reactive discovery procedure, a UE has been pre-configured or configured a AS ID assigned by the network. Each UE retrieves AS group context information of all ULG member UEs within a service range. A UE sends a AS Group Context Discovery message to all UEs within a service range as shown in FIG. 15. The UE may send the message periodically or when it receives a request to transmit a groupcast message from upper layer but does not know its ULG members as shown in step 0 in FIG. 12. The AS Group Context Discovery message may include but not limited to information shown in Table 10. After receiving the AS Group Context Discovery message, A UE that in the same ULG sends a response back to the initiating UE and provides AS group context information.

TABLE 10

| Fields name | Description |
| --- | --- |
| AS Group Context Discovery Message | |
| AS ID of the Initiating UE | The AS layer identification of the UE that initiates the AS Group Context Discovery message. |
| AS ID of the Group Member UEs | The AS ID of the Group Member UEs that report the AS group context information via a response after receiving the request. |
| Sequence Number | The sequence Number generated by the Initiating UE to differentiate the AS Group Context Discovery message it sends. For example, the sequence number is increased by one for each new AS Group Context Discovery message generated. |
| Position | The position of the Initiating UE, e.g. the GPS location. |
| Maximum number of forwarding | The maximum number of times the AS Group Context Discovery message can be forwarded. This value is decreased by one when the AS Group Context Discovery message is forwarded by a Relay UE. The AS Group Context Discovery message which contains zero value of maximum forward time will be discarded. |
| Maximum forward physical range | The maximum distance the AS Group Context Discovery message can be forwarded. A UE will not forward a AS Group Context Request message originated from the Initiating UE, if the distance to the Initiating UE is bigger than the maximum forward range. |
| AS group IDs | AS IDs associated with ULG that the Initiating UE request to discover. If this field is not empty, only the UE that belongs to one of the ULGs reports the AS group context information. |
| AS IDs of Relay UEs traversed | The AS ID of each Relay UE the AS Group Context Discovery message has traversed. Each Relay UE will append its AS ID in this field if it forwards the AS Group Context Discovery message. |

TABLE 11

AS Group Context Discovery Response Message

| Fields name | Description |
| --- | --- |
| AS ID of the Initiating UE | The AS layer identification of the UE that initiates the AS Group Context Discovery message. |
| AS ID of the Reporting UE | The AS ID of the UEs that report the AS group context information via a response after receiving the AS Group Context Discovery message. |
| Sequence Number | The Sequence Number received in the AS Group Context Discovery message. |
| AS group context information | As described in Table 1. |
| AS IDs of Relay UEs traversed | The AS ID of each Relay UE the AS Group Context Discovery message has traversed. The Relay UE may use this information forward the response back to the Initiating UE. |

To illustrate the disclosed procedure, UE 2 in FIG. 1 is used as an example.

At step 1, the Initiating UE sends the AS Group Context Discovery message to its one hop neighbors. The AS Group Context Discovery message may include but not limited to information shown in Table 10. For example, the UE 2 broadcasts a AS Group Context Request to its neighbors, e.g. UE 1 and 5-8 in FIG. 1. The UE 2 may contain the list of AS ID of group member in ULG 1, e.g. UE 2, 4, 6, 7 and 8 in the message. These UEs will send a response to UE 2 after receiving the message. The UE 2 may contain the AS ID of ULG 1.

At step 2a, when a UE, e.g. UE 8, receives the message, it processes the message and decides whether to forward the message to its neighbors. If UE 8 has never received the message with same sequence number originated from the same UE and UE 8 is in ULG 1, UE 8 will send a AS Group Context Discovery Response back to UE 2. UE 8 may decide whether to forward the message to its neighbors based on the following criteria:

Forward if the Initiator UE is in the same ULG;
Forward if it has Control Plane (CP) Relay or User Plane (UP) Relay function;
Forward if the maximum number of forwarding is bigger than zero;
Forward if the distance from the Initiator UE smaller than the maximum forward range;
Forward if it has never received the message with same sequence number originated from the same UE.

If the UE decides to forward the message, it decreases the value of maximum number of forwarding by one in the message and may insert its AS ID configured by the network and the capability information appended in AS Group Context Discovery message, then sends the message to all its neighbors except the transmitter of the message as shown in step 4.

At step 2b, UE 5 follows the same procedure as UE 8 in step 2a.

At step 3, UE 8 sends a AS Group Context Discovery Response back to UE 2. The AS Group Context Discovery Response message may include but not limited to information shown in Table 11.

At step 4, UE 8 then sends the AS Group Context Discovery message to all its neighbors except the transmitter of the message, e.g. UE 4 and UE 5.

At step 5, UE 5 follows the same procedure as UE 8 in step 2a. Since UE 5 already receives a AS Group Context Discovery from UE 2 with the same sequence number, UE 5 will discard the message.

At step 6, UE 5 then sends the AS Group Context Discovery message to all its neighbors except the transmitters of the message, e.g. UE 4.

At step 7, a UE may receive multiple AS Group Context Report messages from the Initiator UE via different paths. The UE may choose a path to send the AS Group Context Discovery Response. The AS Group Context Discovery Response message may include but not limited to information shown in Table 11. The response may contain the AS ID of each relay UE on the path, and these relay UEs forward the response to Initiator UE. For example, UE 4 sends a AS Group Context Discovery Response back to UE 2 via UE 5.

At step 8, UE 5 forward the AS Group Context Discovery Response to UE 2.

AS sub-Group Configuration Procedure.

Figure 16:
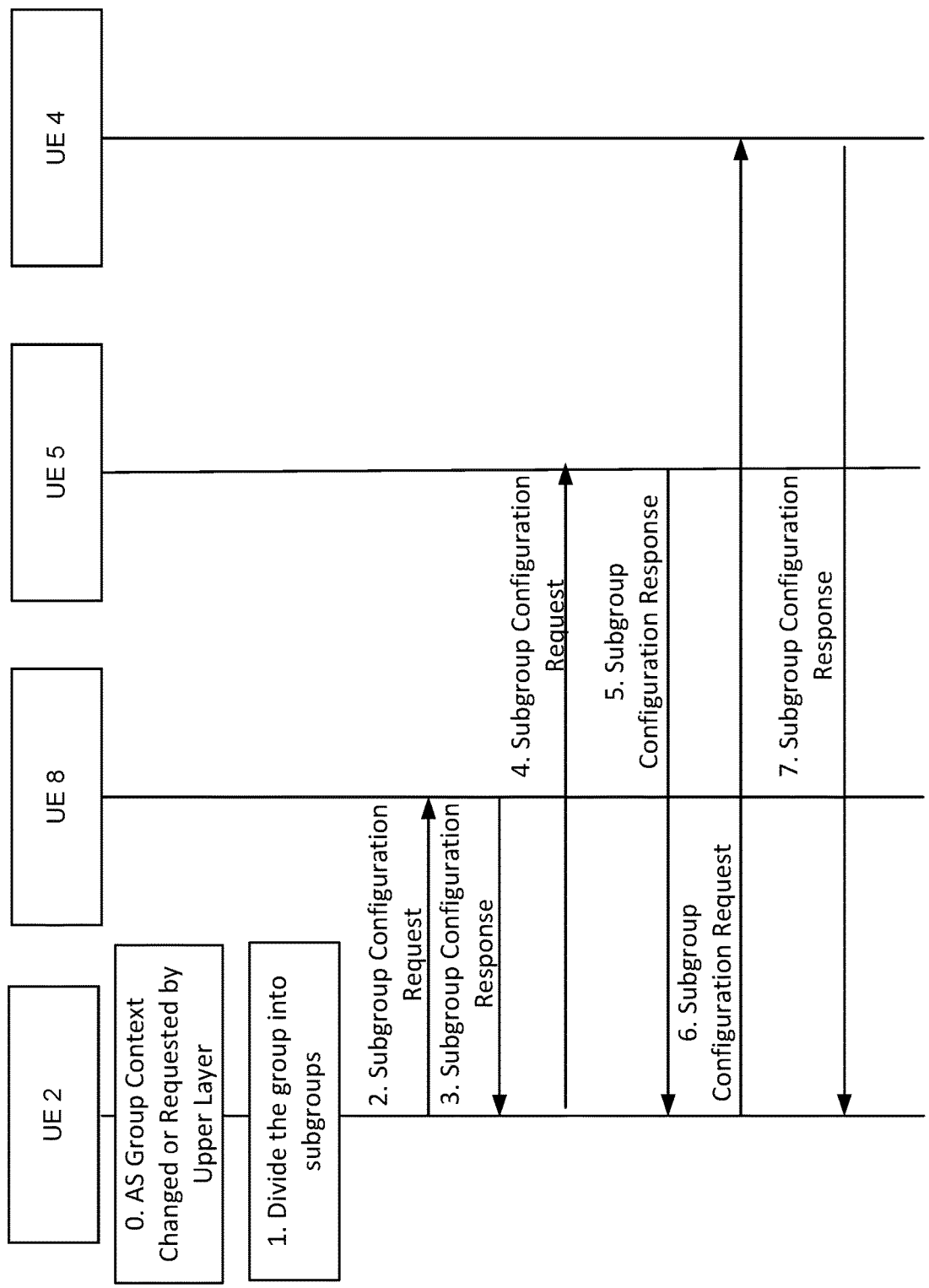
FIG. 16 is a call flow of an example method for a sub-group formation and configuration procedure for distributed AS group management.

Based on the obtained AS context information during AS group context discovery, the Initiator UE organizes the ULG into AS layer sub-groups, configures UE-to-UE relays for each UE and send the AS subgroup configuration information to the UE via dedicated control messages. The procedure can be triggered if the AS group context is changed after a group context discovery procedure. The procedure is the same as the centralized procedure described in section 5.2.1.2 except the Initiator UE organizes the ULG into AS layer subgroups and sends subgroup configuration request to configure UE-to-UE relays for each group member and sends the AS subgroup configuration to each group member as shown in FIG. 16.

Bearer Management to Support Groupcast

Figure 17:
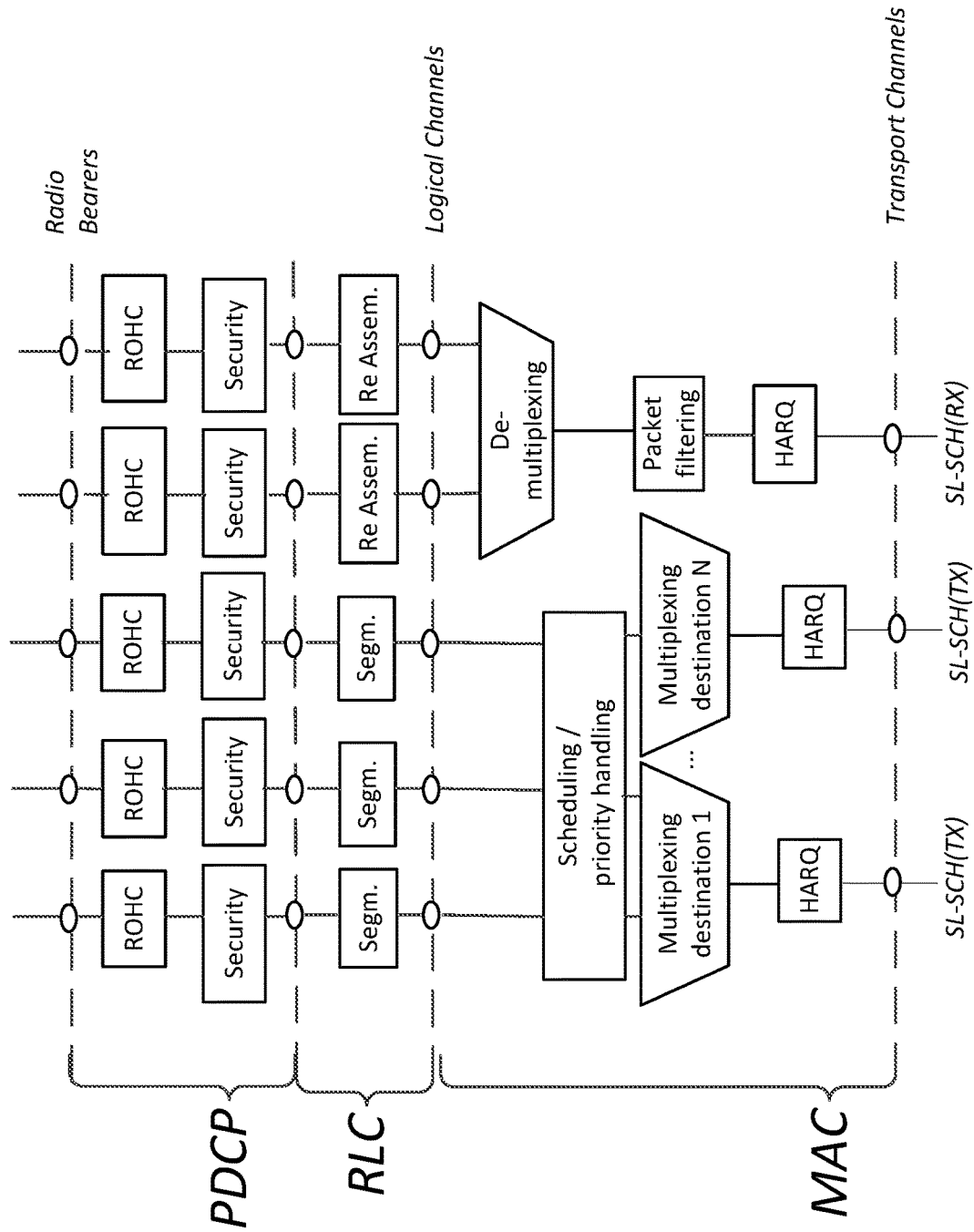
FIG. 17 shows an example L2 Structure View for V2X Sidelink Groupcast.

Detail Layer 2 procedures are disclosed to support each disclosed Layer 2 (L2) structures. The L2 structure view for Sidelink groupcast is shown in FIG. 17. A Layer 2 source and destination ID will be included in each MAC PDU. Packets with different Source Layer-2 ID-Destination Layer-2 ID pair cannot be multiplexed into the same MAC PDU. For the groupcast, the destination ID is the AS ID of the subgroup which is generated based on AS ID of the group and the AS ID of the originator. Therefore, the AS ID of the subgroup will be unique within a local network. The source ID is the AS ID of the UE configured by the network. The MAC layer of each UE has a packet filter function, which delivers a packet to the upper layer if the destination ID of the packet matches the AS ID of subgroups. A UE is configured with a AS ID of a subgroup if it is a member of the subgroup or it serves as a UP Relay to forward groupcast message to a UE which is a member of the subgroup.

Figure 18:
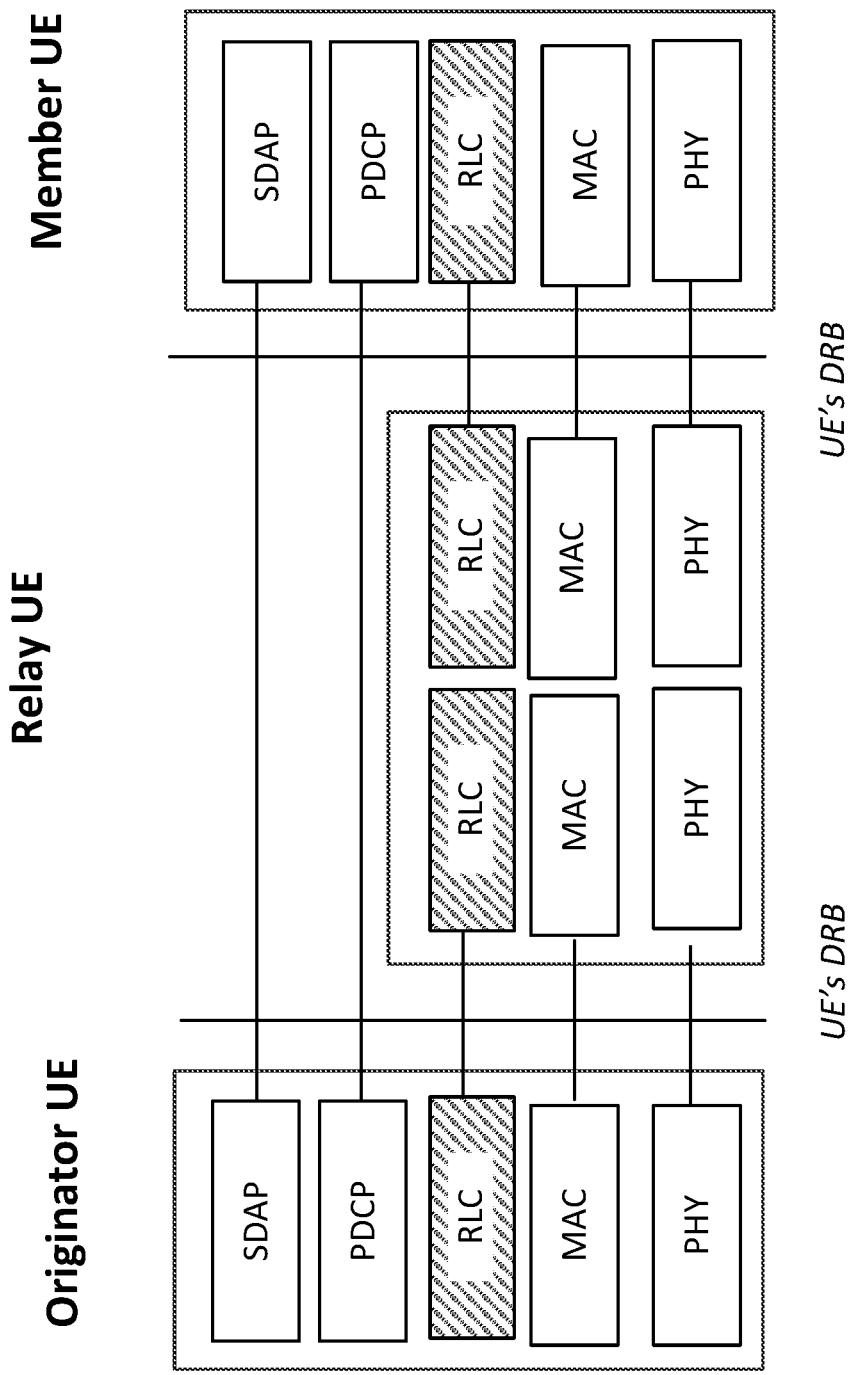
FIG. 18 shows an example of a Layer 2 UP Relay at RLC.
Figure 19:
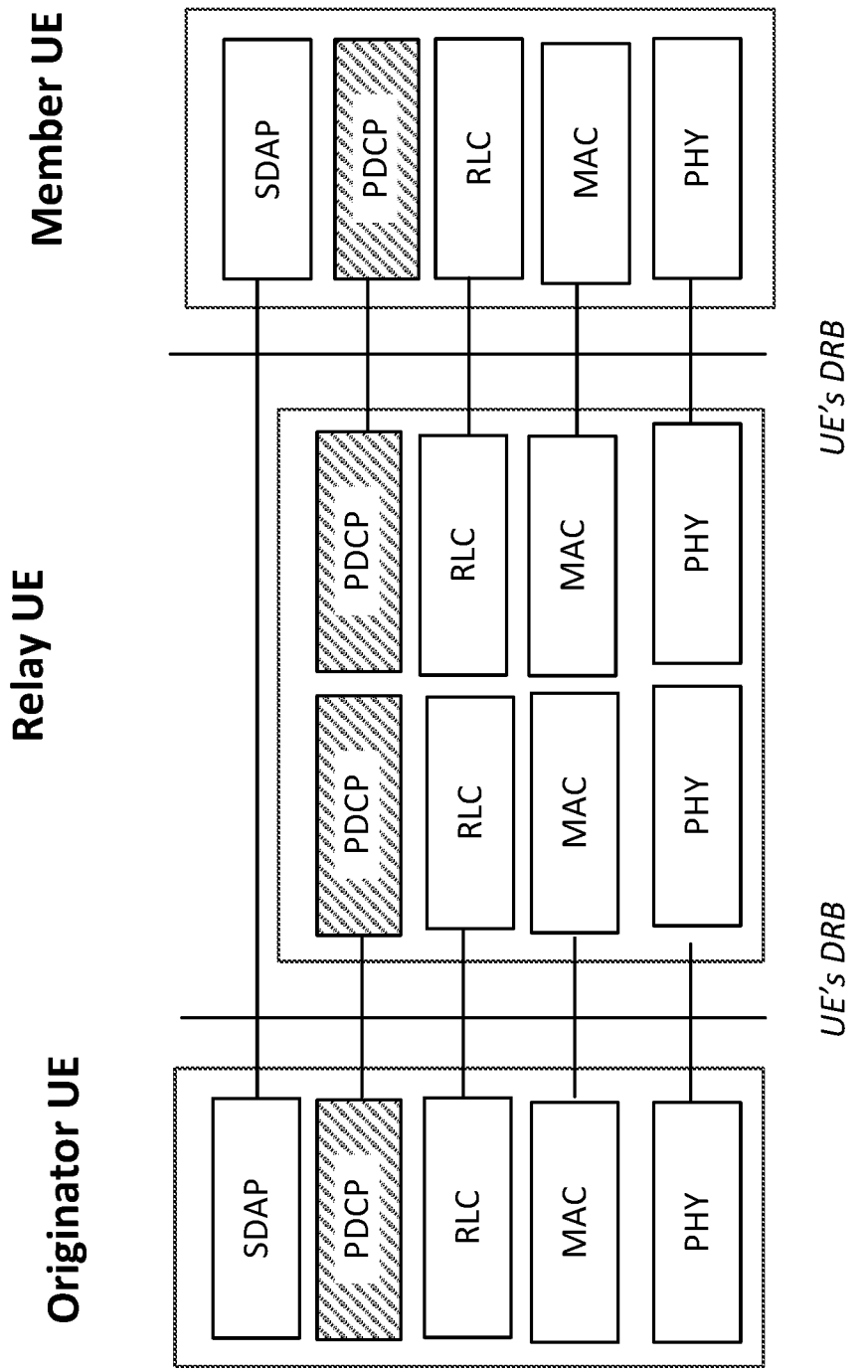
FIG. 19 shows an example of a Layer 2 UP Relay at PDCP.
Figure 20:
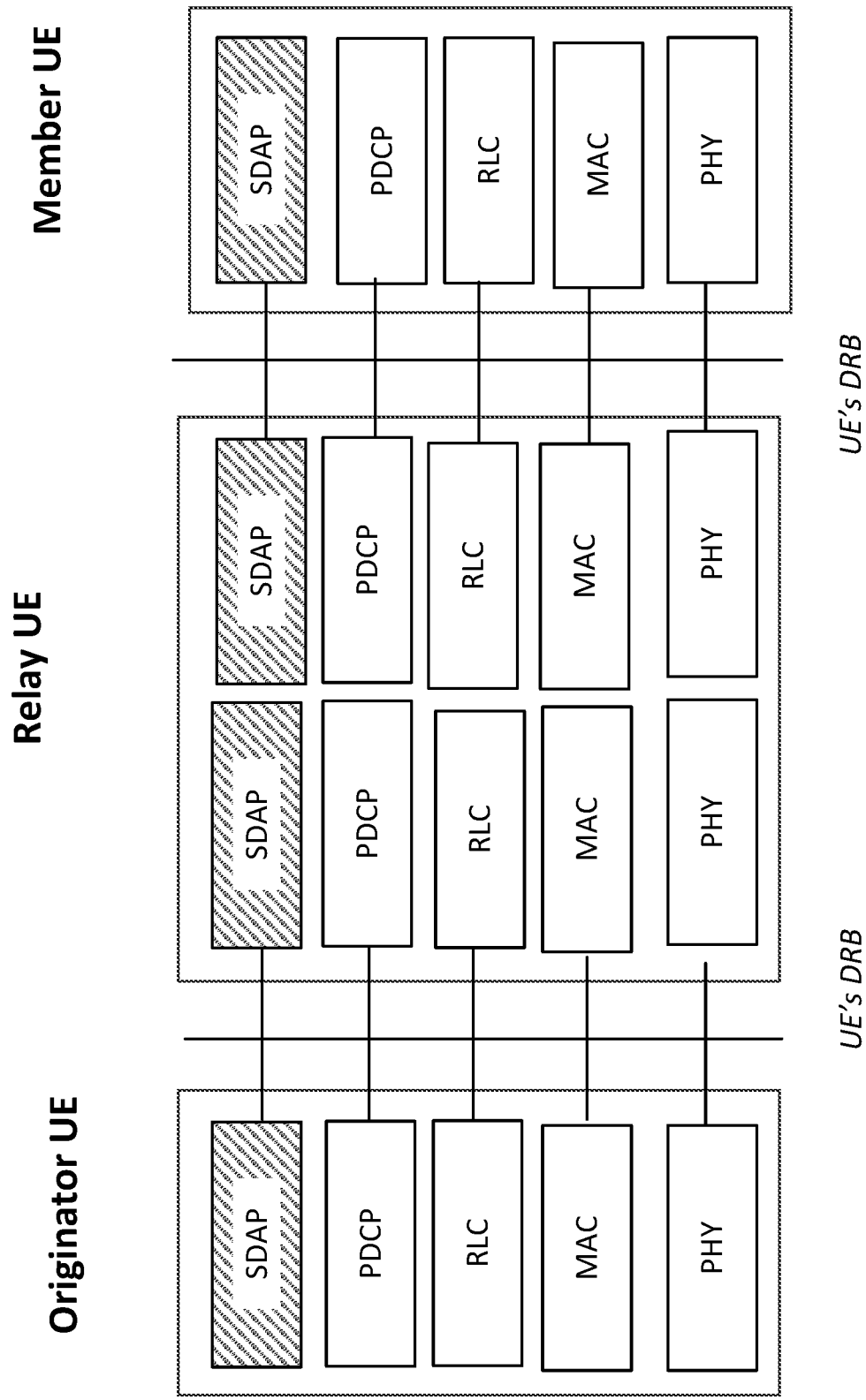
FIG. 20 shows an example of a Layer 2 UP Relay at SDAP.

To illustrate the disclosed procedures, topology in FIG. 1 is used as an example. In FIG. 1, UE 2, 4, 6, 7, and 8 are in the same ULG (ULG), e.g., ULG 1. UE 2 receives a groupcast message from upper layer and intends to transmit it to all UEs in ULG 1. UE 2 maps the ULG 1 to three AS subgroups. Subgroup 1 contains UE 6 and 7 that can be reached via a multicast transmission. Subgroup 2 contains UE 8 that can be reached via a unicast transmission. Subgroup 3 contains UE 4 that can be reached via a unicast transmission to UE 5, which forwards the message to UE 4. UE 5 is a UP Relay that forwards groupcast messages from UE 2 to UE 4. A UP Relay can be a Layer 2 Relay as shown in FIG. 18, FIG. 19, and FIG. 20. To do the Layer 2 Relay at RLC as shown in FIG. 18, the AS ID of the groupcast transmitter and AS ID of the subgroup should be contained in the RLC header. To do the Layer 2 Relay at PDCP as shown in FIG. 19, the AS ID of the groupcast transmitter and AS ID of the subgroup should be contained in the PDCP header. To do the Layer 2 Relay at PDCP as shown in FIG. 19, the AS ID of the groupcast transmitter and AS ID of the subgroup should be contained in the SDAP header.

Subgroup Mapping at SDAP Entity

In this example, when the AS Layer receives a groupcast request from upper layer, the SDAP is configured with group management information as described in Table 6. Based on the information, SDAP entity divides the group into subgroups. Each subgroup has its unique AS subgroup ID as the destination ID. Packets associated with different subgroups have separated radio bearers, which may use a different communication mode. For example, the SDAP at UE 2 makes three duplications of the packet. Each packet has a different destination ID which is the AS ID of the subgroup. Each radio bearer associated with a subgroup receives a copy of the packet. The communication mode of the radio bear associated with subgroup 1 is multicast/broadcast. The communication mode of the radio bear associate with subgroup 2 and 3 is unicast mode. When the MAC layer at UE 5 receives the message with MAC destination ID is the AS ID of subgroup 3 from UE 2, it delivers the packet to the upper sublayer. Since UE 5 is configured as a Relay UE for the subgroup, the RLC, PDCP, or SDAP sublayer relays the packet to UE 4. The source layer 2 ID in the MAC PDU is the AS ID of UE 5 and the destination ID in the MAC PDU is the AS ID of subgroup 3.

Subgroup Mapping at PDCP Entity

In this example, when the AS Layer receive a groupcast request from upper layer, the PDCP entity is configured with group management information as described in Table 6. Based on the information, PDCP entity divides the group into subgroups. Each subgroup has its unique AS subgroup ID as the destination ID. Packets associated with different subgroups have separated RLC Channels, which may use a different communication mode. For example, the PDCP at UE 2 makes three duplications of the packet. Each packet has a different destination ID which is the AS ID of the subgroup. Each RLC Channel associated with a subgroup receives a copy of the packet. The communication mode of the RLC Channel associated with subgroup 1 is multicast/broadcast. The communication mode of the radio bear associate with subgroup 2 and 3 are unicast mode. When the MAC layer at UE 5 receives the message with MAC destination ID is the AS ID of subgroup 3 from UE 2, it delivers the packet to the upper sublayer. Since UE 5 is configured as a Relay UE for the subgroup, the RLC, PDCP or SDAP sublayer relays the packet to UE 4. The source layer 2 ID in the MAC PDU is the AS ID of UE 5 and the destination ID in the MAC PDU is the AS ID of subgroup 3.

Subgroup Mapping at RLC Entity

In this example, when the AS Layer receives a groupcast request from upper layer, the RLC entity is configured with group management information as described in Table 6. Based on the information, the RLC entity divides the group into subgroups. Each subgroup has its unique AS subgroup ID as the destination ID. Packets associated with different subgroups have separated Logical Channels, which may use a different communication mode. For example, the RLC at UE 2 makes three duplications of the packet. Each packet has a different destination ID which is the AS ID of the subgroup. Each Logical Channel associated with a subgroup receives a copy of the packet. The communication mode of the Logical Channel associated with subgroup 1 is multicast/broadcast. The communication mode of the radio bear associate with subgroup 2 and 3 are unicast mode. When the MAC layer at UE 5 receives the message with MAC destination ID is the AS ID of subgroup 3 from UE 2, it delivers the packet to the upper sublayer. Since UE 5 is configured as a Relay UE for the subgroup, the RLC, PDCP or SDAP sublayer relays the packet to UE 4. The source layer 2 ID in the MAC PDU is the AS ID of UE 5 and the destination ID in the MAC PDU is the AS ID of subgroup 3.

The RLC entity makes the duplications of RLC PDU based on the number of subgroups and sends the PDU with different transmission mode to different Logical Channels. For example, if the initial transmission using multicast fails, the RLC entity can retransmits the packet using unicast mode to each group member that does not receive the message.

Abbreviations

The following is a list of acronyms that may appear in the above description. Unless otherwise specified, the acronyms used herein refer to the corresponding term listed below:

| | |
|---|---|
| 3GLTE | Third Generation Long Term Evolution |
| 3GPP | $3^{rd}$ Generation Partnership Project |
| 5G | Fifth Generation Wireless Technology |
| ACK | ACKnowledgement |
| AF | Application Function |
| AMF | Access and Mobility Management Function |
| AP | Access Point |
| APP | Application |
| AR | Augmented Reality |
| AS | Access Stratum |
| AS ID | The ID in the AS layer. The AS ID can be configured by the network or scheduling entity. An example of an AS ID is Link Layer (Layer 2) ID, which can be use as Layer 2 Source ID and Layer 2 destination ID. |
| ASICs | Application Specific Integrated Circuits |
| AUSF | Authentication Server Function |
| BSC | Base Station Controller |
| BTS | Base Transceiver Station |
| BTS | Base Transceiver Station |
| CD-ROM | Compact Disk-Read Only Memory |
| CP | Control Plane |
| CUE | special cooperative UE |
| D2D | Device to Device Communication |
| DL | Downlink |
| DSP | Digital Signal Processor |
| DVD | Digital Video Disc |
| EDGE | Enhanced Data rates for GSM Evolution |
| eMBB | Enhanced Mobile Broadband |
| eNB | Evolved Node B |
| eNodeB | evolved home node-B |
| E-UTRA | Evolved UMTS Terrestrial Radio Access |
| eV2X | Enhanced Vehicle-to-Everything |
| FM | Frequency Modulated |
| FPGAs | Field Programmable Gate Array |
| GGSN | Gateway GPRS Support Node |

| | |
|---|---|
| gNB | NR NodeB |
| gNode-B | a next generation node-B |
| GPRS | General Packet Radio Service |
| GPS | Global Positioning System |
| GSM | Global System for Mobile communications |
| GUI | Graphical User Interface |
| HARQ | Hybrid Automatic Repeat Request |
| HeNB | a home evolved node B |
| HSDPA | High-Speed Downlink Packet Access |
| HSPA | High-Speed Packet Access |
| HSUPA | High-Speed Uplink Packet Access |
| IC | Integrated Circuit |
| ID | Identity or Identifier |
| IMS | IP Multimedia Subsystem |
| IP | Internet Protocol |
| IR | Microwave Infrared |
| IS-856 | Interim Standard 856 |
| IS-95 | Interim Standard 95 |
| ITS | Intelligent Transport System |
| ITS-AID | ITS Application Identifier |
| IuCS | an interface toward the CS (circuit switching) domain of the core network |
| IuPS | an interface toward the PS (packet switching) domain of the core network |
| L2 | Layer 2 |
| LCD | liquid crystal display |
| LCH | Logical Channel |
| LTE | Long Term Evolution |
| LTE-A | Long Term Evolution Advanced |
| MAC | Medium Access Control |
| MGW | Media Gateway |
| MIMO | Multiple-Input Multiple Output |
| MME | Mobility Management Gateway Gateway |
| mMTC | Massive Machine Type Communications |
| MSC | Mobile Switching Center |
| N3IWF | Non-3GPP Interworking Function |
| NAS | Non-Access Stratum |
| NB | NodeB |
| NEF | Network Exposure Function |
| NR | New Radio |
| OLED | Organic light-emitting diode |
| PC3 | A reference point between ProSe-enabled UEs and a ProSe network function. |
| PC5 | A reference point between ProSe-enabled UEs used for control and user plane for ProSe Direct Discovery, ProSe Direct Communication and ProSe UE-to-Network Relay |
| PCF | Policy Control Function |
| PDA | personal digital assistant |
| PDCP | Packet Data Convergence Protocol |
| PDN | Packet Data Network |
| PDU | Protocol Data Unit |
| PHY | Physical layer |
| POTS | Plain Old Telephone Service |
| ProSe | Proximity-Based Services |
| PSID | Provider Service Identifier |
| PSTN | Public Switched Telephone Network |
| QoS | Quality of Service |
| RAM | random-access memory |
| RAN | Radio Access Network |
| RAT | radio access technology |
| RF | Radio Frequency |
| RG | Residential Gateway |
| RLC | Radio Link Control |
| RNC | Radio Network Controller |
| ROM | read-only memory |
| RRC | Radio Resource Control |
| RRHs | Remote Radio Heads |
| RSU | Roadside Unit |
| Rx | Groupcast Receiver |
| SD | Secure Digital |
| SDAP | Service Data Adaptation Protocol |
| SDU | Service Data Unit |
| SGSN | Serving GPRS Support Node |
| SIM | subscriber identity module |
| SL | Sidelink |
| SMF | Session Management Function |
| SMS | short message service |
| TCP | Transmission Control Protocol |
| TRPs | Transmission and Reception Points |
| Tx | Groupcast Transmitter |
| UDM | User Data Management Function |
| UDP | User Datagram Protocol |
| UDR | User Data Repository |
| UE | User Equipment |
| UL | Uplink |
| ULG | Upper Layer Group |
| UMTS | Universal Mobile Telecommunications System |
| UP | User Plane |
| UPFs | User Plane Functions |
| URLLC | Ultra-Reliable Low-Latency Communication |
| USB | Universal Serial Bus |
| UTRA | Terrestrial Radio Access |
| UV | Ultra Violet |
| V2I | Vehicle-to-Infrastructure |
| V2N | Vehicle-to-Network |
| V2P | Vehicle-to-Person |
| V2V | Vehicle-to-Vehicle |
| V2X | Vehicle-to-X Communication |
| VR | Virtual Reality |
| WCDMA | Wideband CDMA |
| WiMAX | Worldwide Interoperability for Microwave Access |
| WTRU | Wireless Transmit/Receive Unit |

What is claimed is:

1. A wireless transmit/receive unit (WTRU) comprising:
a processor configured to:
receive a groupcast packet;
receive information about a first upper layer group of devices for transmission of the groupcast packet;
map the first upper layer group of devices to one or more other groups of devices;
select one or more second access stratum groups of devices from the one or more other groups of devices; and
transmit the groupcast packet to the selected one or more second access stratum groups of devices.

2. The WTRU of claim 1, wherein the WTRU is configured with a configuration comprising one or more of:
an Access Stratum (AS) identifier (ID) of the WTRU;
an upper layer group ID of a first group of devices to which the WTRU belongs;
an AS group ID associated with the first group of devices; or
a capability of the WTRU to forward a control plane packet or a user plane packet to an apparatus within a range,
wherein the WTRU is preconfigured with the configuration, or
wherein the processor is configured to receive the configuration from a network device.

3. The WTRU of claim 2, wherein the processor is configured to receive the groupcast packet from an upper layer of the WTRU or from an apparatus;
wherein the apparatus is an upstream relay device or a downstream relay device;
wherein the network device comprises a base station, a Roadside Unit (RSU), or a Core Network (CN) node;
wherein processor is configured to perform an Access Stratum (AS) group management procedure to create a mapping between the first upper layer group of devices and the one or more other groups of devices; and
wherein the processor is configured to send a group management request to a second apparatus, wherein the group management request comprises one or more of an identifier (ID) of the first group of devices, a position of the WTRU, or a service range of the first group of devices.

4. The WTRU of claim 1, wherein the processor is configured to receive the groupcast packet from an upper layer of the WTRU or from an apparatus.

5. The WTRU of claim 1, wherein the processor is configured to receive information about the first group of devices from an upper layer of the WTRU, wherein the information about the first group of devices comprises an identifier (ID) of the first group of devices, a Quality of Service (QOS) requirement, a group size, or a list of IDs of devices in the first group of devices.

6. The WTRU of claim 1, wherein the processor is configured to check whether a mapping between the first group of devices and the one or more of the other groups of devices exists in the WTRU, and use the mapping to select the one or more second groups of devices from the one or more other groups of devices.

7. The WTRU of claim 1, wherein the processor is configured to perform an Access Stratum (AS) group management procedure to create a mapping between the first group of devices and the one or more other groups of devices.

8. The WTRU of claim 7, wherein the processor is configured to send a group management request to an apparatus, wherein the group management request comprises one or more of:
   an identifier (ID) of the first group of devices;
   a position of the WTRU; or
   a service range of the first group of devices.

9. The WTRU of claim 8, wherein the processor is configured to send, to an apparatus, an AS Group Context Report message comprising of one or more of:
   an AS identifier (ID) of a reporting device;
   an AS ID of an AS group manager;
   a sequence number;
   a position;
   a maximum number of forwarding;
   a maximum forward physical range;
   AS group context information, comprising one or more of AS group IDs, a relay capability, or an AS group context information of a neighbor;
   AS IDs of relay WTRU s traversed on a path; or
   a capability of a relay WTRU traversed.

10. The WTRU of claim 8, wherein the processor is configured to receive, from the apparatus, a mapping between the first group of devices and the one or more other groups of devices, and to use the received mapping to select the one or more second groups of devices from the one or more other groups of devices.

11. The WTRU of claim 7, wherein the processor is configured to perform a distributed group management procedure by:
   sending, via one or more AS Group Context Advertisement messages to all devices within a service range, AS group context information and a discovery request;
   receiving discovery responses from one or more devices within the service range to obtain further AS group context information;
   generating a mapping between the first group of devices and the one or more other groups of devices;
   configuring one or more third devices with configuration information for one or more second group of devices; and
   using the generated mapping to select the one or more second groups of devices from the one or more other groups of devices.

12. The WTRU of claim 1, wherein the processor is configured to select the second group of devices using information contained in a packet message and a configuration received from another apparatus.

13. The WTRU of claim 1, wherein the processor is configured to select a transmission method based on properties of one of the one or more second groups, wherein the properties comprise a distance between devices in the group and a number of devices in the group.

14. The WTRU of claim 1, wherein the processor is configured to select a Hybrid Automatic Repeat Request (HARQ) method based on properties of one of the one or more second groups, the properties comprising a distance between devices and a number of devices in the one of the one or more second groups, and wherein the processor is configured to:
   indicate which devices of the one of the one or more second groups should send back an acknowledgement; or
   indicate which devices of the one of the one or more second groups should send back a negative acknowledgement upon failing to receive the packet.

15. A fourth-wireless transmit/receive unit (WTRU) comprising:
   a processor configured to:
   receive, from an apparatus, a group management request comprising one or more of:
   an identifier (ID) of a first upper layer group of devices comprising the apparatus, the first upper layer group of devices being a group for transmission of a groupcast packet;
   a position of the apparatus; or
   a service range of the first group of devices,
   wherein the processor is configured to receive access stratum (AS) group context information via one or more AS Group Context Report messages, the one or more AS Group Context Report messages comprising one or more of:
   an AS identifier (ID) of a reporting User Equipment (UE);
   an AS ID of an AS group manager;
   a sequence number;
   a position;
   a maximum number of forwarding;
   a maximum forward physical range;
   AS group context information, comprising one or more of AS group IDs, a relay capability, or AS group context information of a neighbor;
   AS IDs of relay WTRU s traversed on a path; or
   a capability of a relay WTRU traversed,
   wherein the processor is configured to generate a mapping of the first upper layer group of devices to a second access stratum group of devices, and to select the second access stratum group of devices from one or more other groups of devices based on the one or more AS group context report messages.

16. The WTRU of claim 15, wherein the processor is configured to periodically send an AS group context request message to devices within a service range.

17. The WTRU of claim 15, wherein the processor is configured to receive a group management request message from another apparatus.

18. The WTRU of claim 15, wherein the processor is configured to send, via one or more dedicated control messages to one or more third devices within a service range, configuration information for the second group of devices, wherein the one or more dedicated control messages comprise an AS ID of the first group of devices, and wherein the one or more dedicated control messages comprise identifying information for the second group of devices.

* * * * *

UNITED STATES PATENT AND TRADEMARK OFFICE
CERTIFICATE OF CORRECTION

PATENT NO. : 12,245,106 B2
APPLICATION NO. : 17/628761
DATED : March 4, 2025
INVENTOR(S) : Zhuo Chen et al.

Page 1 of 1

It is certified that error appears in the above-identified patent and that said Letters Patent is hereby corrected as shown below:

In the Claims

In Claim 15: Column 46, Line 23 delete "fourth-".

Signed and Sealed this
Twentieth Day of May, 2025

Coke Morgan Stewart
*Acting Director of the United States Patent and Trademark Office*